(12) United States Patent
Kim et al.

(10) Patent No.: US 7,653,143 B2
(45) Date of Patent: Jan. 26, 2010

(54) DIGITAL TELEVISION TRANSMITTER AND RECEIVER FOR TRANSMITTING AND RECEIVING DUAL STREAM USING 4 LEVEL VESTIGIAL SIDE BAND ROBUST DATA

(75) Inventors: Sung-Hoon Kim, Daejon (KR); Kum-Ran Ji, Jeollanam-do (KR); Seung-Won Kim, Daejon (KR); Chieteuk Ahn, Daejon (KR); Young-Hoon Shim, Seoul (KR); Dae-Jin Kim, Gwangju (KR); Young-Ho Oh, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 609 days.

(21) Appl. No.: 10/541,569

(22) PCT Filed: Dec. 30, 2003

(86) PCT No.: PCT/KR03/02918

§ 371 (c)(1),
(2), (4) Date: Apr. 26, 2006

(87) PCT Pub. No.: WO2004/062283

PCT Pub. Date: Jul. 22, 2004

(65) Prior Publication Data

US 2006/0269012 A1    Nov. 30, 2006

(30) Foreign Application Priority Data

Jan. 6, 2003    (KR) .................... 10-2003-0000512
Dec. 29, 2003   (KR) .................... 10-2003-0099109

(51) Int. Cl.
*H03C 1/52*    (2006.01)
(52) U.S. Cl. .................... 375/270; 375/240; 375/252; 375/265; 375/286; 714/756; 714/755; 714/792

(58) Field of Classification Search ................ 375/270, 375/240, 252, 265, 301, 286; 714/756, 755, 714/792
See application file for complete search history.

(56) References Cited

U.S. PATENT DOCUMENTS 5,987,070 A * 11/1999 Fimoff et al. ............... 375/286
6,810,084 B1 * 10/2004 Jun et al. ................. 375/240.28

(Continued)

FOREIGN PATENT DOCUMENTS

KR    10 0304889    7/2001

(Continued)

*Primary Examiner*—Chieh M Fan
*Assistant Examiner*—Eva Y Puente
(74) *Attorney, Agent, or Firm*—Ladas & Parry LLP

(57) ABSTRACT

The present invention relates to a Vestigial Side Band (VSB) Digital Television (DTV) in agreement with the DTV standards (A/53) of the Advanced Television System Committee (ATSC), and to a method thereof. More particularly, it provides 4-VSB DTV transceiver that improves reception performance of a receiver by transmitting and receiving dual streams formed of normal data and robust data without increasing average power, regardless of a mixing ratio of the normal and robust data. The 4-VSB DTV transceiver of the present research includes an encoding unit for encoding the robust data to be mapped to one of two groups having 4 levels $\{-5, -3, 1, 7\}$ and $\{-7, -1, 3, 5\}$.

45 Claims, 24 Drawing Sheets

U.S. PATENT DOCUMENTS

| | | | | |
|---|---|---|---|---|
| 7,020,828 | B2 * | 3/2006 | Birru | 714/792 |
| 7,111,221 | B2 * | 9/2006 | Birru et al. | 714/755 |
| 7,206,352 | B2 * | 4/2007 | Birru et al. | 375/265 |
| 2002/0181581 | A1 * | 12/2002 | Birru et al. | 375/240.01 |
| 2002/0191712 | A1 * | 12/2002 | Gaddam et al. | 375/301 |
| 2007/0140368 | A1 * | 6/2007 | Kim et al. | 375/265 |
| 2007/0208987 | A1 * | 9/2007 | Kim et al. | 714/756 |
| 2007/0222889 | A1 * | 9/2007 | Lee et al. | 348/441 |

FOREIGN PATENT DOCUMENTS

| | | |
|---|---|---|
| KR | 10 0323665 | 1/2002 |
| WO | WO02 100026 | 12/2002 |

* cited by examiner

DIGITAL TELEVISION TRANSMITTER AND RECEIVER FOR TRANSMITTING AND RECEIVING DUAL STREAM USING 4 LEVEL VESTIGIAL SIDE BAND ROBUST DATA

TECHNICAL FIELD

The present invention relates to a Vestigial Side Band (VSB) Digital Television (DTV) transceiver in agreement with DTV standards (A/53) of the Advanced Television System Committee (ATSC) and a method thereof; and, more particularly, to a dual stream DTV transceiver utilizing particular 4-level VSB (4-VSB) robust data and a method thereof.

BACKGROUND ART

Advanced Television System Committee (ATSC) Standards for High Definition Television (HDTV) data transmission through a terrestrial broadcasting channel utilizes signals obtained by modulating 12 independent data streams that have gone through trellis encoding and time-multiplexing into 8-VSB symbol streams {−7, −5, −3, −1, 1, 3, 5, 7} of 10.76 MHz rate. The signals are converted into signals of a 6-MHz frequency band, which correspond to standard Very High Frequency (VHF) or Ultrahigh Frequency (UHF) terrestrial television channels. Signals of the channel are broadcasted in a data rate of 19.39 Mbps. More details for the ATSC DTV Standards and A/53 are available at http://www.atsc.org/.

FIG. 1 is a block diagram illustrating a typical Digital Television (DTV) transmitter. The typical DTV transmitter includes a data randomizer 101, a Read Solomon (RS) encoder 103, a data interleaver 105, a trellis encoder 107, a multiplexer (MUX) 109, a pilot adder 11, a Vestigial Side Band (VSB) modulator 113, and a radio frequency (RF) converter.

Data inputted to the transmitter 100 are serial data streams each formed of 188-byte Moving Picture Experts Group (MPEG)-compatible data packets, the 188-byte data packets including one synchronization byte and 187 bytes for payload data.

The inputted data are randomized in a data randomizer 101. Each packet is encoded to include 20-byte parity information for Forward Error Correction (FEC) in the RS encoder 103. The FEC includes RS coding, ⅙ data field interleaving, and ⅔ trellis coding. According to the ATSC Standards, the data randomizer 101 performs XOR on all payload data bytes inputted to pseudo random binary sequences (PRBS) each of which has a maximum length of 16 bytes and initialized at a data field beginning point.

The RS encoder 103 receives randomized data outputted from the data randomizer 101. It generates data having a total of 207 bytes to be transmitted for each data segment by adding 20 RS parity bytes for FEC to 187-byte data. The randomizing and FEC process are not performed on the synchronization bytes corresponding to segment synchronization signals among the input packet data.

Subsequently, data packets included in a consecutive segment of each data field are interleaved in the data interleaver 105 to obtain interleaved data packets. The interleaved data packets are interleaved again in the trellis encoder 107 and then encoded.

The trellis encoder 107 generates data symbol streams each expressed in three bits by using inputs of two bits. One bit out of the two-bit input is precoded, and the other bit is 4-state-trellis-encoded to thereby output two bits. The three bits outputted from the trellis encoder 107 are mapped to an 8-level symbol. The conventional trellis encoder 107 includes 12 parallel trellis encoders and precoders to generate 12 interleaved and/or coded data sequences.

The 8-level symbol is generated as a data frame for transmission after combined in the multiplexer 109 with segment synchronization and field synchronization bit sequences 117 that are transmitted from a synchronization unit (not shown). Then, a pilot signal is added to the pilot adder 111.

The 8-level data symbol stream goes through a VSB suppressed-carrier modulation in the VSB modulator 113 to thereby obtain a base band 8-VSB symbol stream. The base band 8-VSB symbol stream is converted into RF signals in the RF converter 115 and then transmitted.

FIG. 2 is a block diagram showing a typical DTV receiver. The DTV receiver includes a tuner 201, an intermediate frequency (IF) filter and detector, a National Television Systems Committee (NTSC) rejection filter 205, an equalizer and phase tracker 207, a trellis decoder 209, a data deinterleaver 211, an RS decoder 213, a data derandomizer 217, and a synchronization and timing recovery block 215.

The RF signals transmitted from the DTV transmitter 100 are broadcasted through a channel selected by the tuner 210 of the DTV receiver 200. Then, the RF signals are filtered into IF signals and a synchronization frequency is detected in the IF filter and detector 203. In the synchronization and timing recovery unit 215, synchronization signals are detected and clock signals are restored.

Subsequently, the NTSC rejection filter 205 removes NTSC interference signals out of the signals through a comb filter, and the equalizer and phase tracker 250 performs equalization and phase tracking. The data symbols whose multipath interference is eliminated are encoded and go through trellis decoding in the trellis decoder 209.

The decoded data symbols are deinterleaved in the data deinterleaver 211. The deinterleaved data symbols go through RS decoding in the RS decoder 213 and derandomization in the data derandomizer 217. Accordingly, the MPEG-compatible data packets transmitted from the DTV transmitter 100 are restored.

FIG. 3 is a diagram depicting a transmitting data frame exchanged between the transmitter of FIG. 1 and the receiver of FIG. 2. As illustrated in the drawing, the transmitting data frame includes two data fields and each data field is formed of 313 data segments.

The first data segment of each data field is a data field synchronization signal, which is a synchronization signal, and it includes a data sequence for training, which is used in the DTV receiver 200. Each of the other 312 data segments includes 20-byte data for FEC of a 188-byte transport packet. The data in each data segment are formed of data included in a few transmitting packets for data interleaving. In short, the data of each data segment can correspond to a few transmitting packet data.

Each data segment is formed of 832 symbols. The first four symbols are binary and they provide data segment synchronization. A data segment synchronization signal corresponds to a synchronization byte, which is the first byte of 188 bytes that constitute an MPEG-compatible data packet.

The other 828 symbols correspond to the other 187 bytes of the MPEG-compatible data packet and the 20 bytes for FEC. The 828 symbols are transmitted in the form of 8-level signals. Each of the symbols is expressed in three bits. Therefore, data of a total of 2484 bits (2484 bits=828 symbols×3 bits) are transmitted for each data segment.

In the prior art, however, transmitting signals of a conventional 8-VSB transceiver are distorted in an indoor or mobile channel environment due to variable channel and/or multipath effects, which leads to degraded reception performance of the DTV receiver.

In short, transmitting data are under influence of various channel distortion factors, such as multipath effect, frequency offset, and phase jitter. To compensate for such signal distortion generated due to the channel distortion factors, a data sequence for training, which is to be referred to as training data sequence hereafter, is transmitted every 24.2 milliseconds.

However, multipath properties may be changed or Doppler Effect may occur to distort receiving signals even between the time intervals of 24.2 ms when the training data sequence is transmitted. What makes it worse is that an equalizer of the receiver does not provide a quick converging speed enough to compensate for the receiving signal distortion. So, the receiver can hardly carry out equalizing accurately. For this reason, the 8-VSB type transceiver shows lower DTV broadcasting reception performance than an analogue transceiver. Moreover, it cannot receive any signals in a mobile environment at all. Even if it receives signals, there is a problem that the signal-to-noise ratio (SNR) satisfying threshold of visibility (TOV) hikes.

To solve the above problems, another prior art is disclosed in International Publication Nos. WO 02/080559, WO 02/100026 and U.S. Patent Publication No. US2002/0194570, in which robust data are transmitted in the form of a 4-level symbol $\{-7, -5, 5, 7\}$ or $\{-7, -3, 3, 7\}$.

The prior art restricts the symbols mapped with the robust data, so there is a problem that the average power of the symbols expressing the robust data is increased compared to the conventional technology utilizing an 8-VSB transceiver. The average power of robust data is 21 energy/symbol in the conventional 8-VSB transceiver.

That is, in case that the robust data are transmitted in the form of one among the 4-level symbols of $\{-7, -5, 5, 7\}$, the symbol average power is 37 energy/symbol. If the robust data are transmitted in the form of one among the 4-level symbols of $\{-7, -3, 3, 7\}$, the symbol average power is 29 energy/symbol. This shows increased average power of a symbol expressing robust data, compared to the conventional technology using an 8-VSB transceiver.

The increase in the average power of a symbol expressing robust data leads to the increase in the overall average power. If signals are transmitted with a limited power output, which is the usual case, the transmitting power of normal data is decreased relatively, compared to the conventional 8-VSB technology. Thus, there is a problem that the reception performance becomes worse than the conventional 8-VSB technology in the same channel environment.

This problem becomes more serious as the ratio of robust data mixed with normal data is increased. As a result, reception performance is degraded even in a good channel environment. Further, backward compatibility may not be provided to an 8-VSB receiver.

DISCLOSURE OF INVENTION

It is, therefore, an object of the present invention to provide a dual stream Digital Television (DTV) transceiver utilizing a particular 4-vestigial side band (VSB) robust data that decreases signal-to-noise ratio (SNR), the transceiver that can improve the decoding performance of an equalizer and a trellis decoder in a DTV receiver and improve the reception performance for normal data as well as robust data to satisfy Threshold of Visibility (TOV) and a method thereof. The transceiver can be improved as such by transmitting and receiving dual streams, each formed of normal data of 8-VSB type and robust data of 4-VSB type which perform additional Forward Error Correction (FEC), without increasing average power, regardless of the mixture ratio of robust data to normal data.

The other objects and advantages of the present invention can be understood from the drawings, detailed description and claims of the present specification by those of ordinary skill in the art to which the present invention belongs.

In accordance with one aspect of the present invention, there is provided a system for transmitting a digital signal, including: an input unit for receiving digital video data stream; an encoding unit for encoding robust data included in the digital video data stream such that the robust data are mapped to one of two groups $\{-5, -3, 1, 7\}$ and $\{-7, -1, 3, 5\}$ each having four levels, to thereby generate an encoded signal; and a vestigial side band (VSB) transmitting unit for performing VSB modulation of the encoded signal to generate a VSB modulated signal and transmitting the VSB modulated signal.

In accordance with another aspect of the present invention, there is provided a system for transmitting a digital signal, including: an input unit for receiving a digital video data stream; a first encoding unit for encoding robust data included in the digital video stream wherein the robust data are mapped to one of two groups $\{-5, -3, 1, 7\}$ and $\{-7, -1, 3, 5\}$ each having four levels; a second encoding unit for encoding robust data such that the robust data are mapped to another group having four levels; a selecting unit for allowing one of the first encoding unit and the second encoding mean to receive the robust data; and a VSB transmitting unit for performing VSB modulation of the encoded signal to generate a VSB modulated signal and transmitting the VSB modulated signal.

In accordance with another aspect of the present invention, there is provided a system for transmitting/receiving a digital signal, including: a transmitting apparatus for transmitting the digital signal; and a receiving apparatus for the digital signal, wherein the transmitting apparatus includes: an input unit for receiving a digital video data stream; an encoding unit for encoding robust data included in the digital video data stream such that the robust data are mapped to one of two groups $\{-5, -3, 1, 7\}$ and $\{-7, -1, 3, 5\}$ each having four levels, to thereby generate an encoded signal; and a VSB transmitting unit for performing VSB modulation of the encoded signal to generate a VSB modulated signal and transmitting the VSB modulated signal, wherein the receiving apparatus includes: a receiver for receiving and converting the VSB modulated signal into a baseband signal; an equalizer for deciding a level of the robust data based on the group which is used for encoding the robust data in the transmitting apparatus, to thereby generate an equalized signal; and a trellis decoding unit for performing trellis decoding of the equalized signal based on the group which is used for encoding the robust data in the transmitting apparatus, to thereby generate a trellis decoded signal; and a decoding unit for decoding the trellis decoded signal to restore the digital video data stream.

In accordance with another aspect of the present invention, there is provided a system for transmitting/receiving a digital signal, including: a transmitting apparatus for transmitting the digital signal; and a receiving apparatus for the digital signal, wherein the transmitting apparatus includes: an input unit for receiving a digital video data stream; a first encoding unit for encoding robust data included in the digital video stream wherein the robust data are mapped to one of two groups $\{-5, -3, 1, 7\}$ and $\{-7, -1, 3, 5\}$ each having four levels; a second encoding unit for encoding robust data such that the robust data are mapped to another group having four levels; a selecting unit for allowing one of the first encoding unit and the second encoding mean to receive the robust data; a selecting unit for allowing one of the first encoding unit and the second encoding mean to receive the robust data; and a VSB transmitting unit for performing VSB modulation of the encoded signal to generate a VSB modulated signal and transmitting the VSB modulated signal, wherein the receiving apparatus includes: a receiver for receiving and converting the VSB modulated signal into a baseband signal; an equalizer for deciding a level of the robust data based on the group which is used for encoding the robust data in the transmitting apparatus, to thereby generate an equalized signal; and a trellis decoding unit for performing trellis decoding of the equalized signal based on the group which is used for encoding the robust data in the transmitting apparatus, to thereby generate a trellis decoded signal; and a decoding unit for decoding the trellis decoded signal to restore the digital video data stream.

In accordance with another aspect of the present invention, there is provided the system for receiving a digital signal, including: a receiver for receiving and converting a VSB modulated signal into a baseband signal; an equalizer for deciding a level of the robust data mapped to one of two groups $\{-5, -3, 1, 7\}$ and $\{-7, -1, 3, 5\}$, based on the group which is used for encoding the robust data in a transmitting apparatus, to thereby generate an equalized signal; and a trellis decoding unit for performing trellis decoding of the equalized signal based on the group which is used for encoding the robust data in the transmitting apparatus, to thereby generate a trellis decoded signal; and a decoding unit for decoding the trellis decoded signal to restore the digital video data stream.

In accordance with another aspect of the present invention, there is provided the system for receiving a digital signal, including: a receiver for receiving and converting a VSB modulated signal into a baseband signal; an equalizer for deciding a level of the robust data mapped to groups including two groups $\{-5, -3, 1, 7\}$ and $\{-7, -1, 3, 5\}$, each of which has four levels, based on the group which is used for encoding the robust data in a transmitting apparatus, to thereby generate an equalized signal; and a trellis decoding unit for performing trellis decoding of the equalized signal based on the group which is used for encoding the robust data in the transmitting apparatus, to thereby generate a trellis decoded signal; and a decoding unit for decoding the trellis decoded signal to restore the digital video data stream.

In accordance with another aspect of the present invention, there is provided a method for transmitting a digital signal, including the steps of: a) receiving digital video data stream; b) encoding robust data included in the digital video data stream such that the robust data are mapped to one of two groups $\{-5, -3, 1, 7\}$ and $\{-7, -1, 3, 5\}$ each having four levels, to thereby generate an encoded signal; and d) performing VSB modulation of the encoded signal to generate a VSB modulated signal and transmitting the VSB modulated signal.

In accordance with another aspect of the present invention, there is provided a method for transmitting/receiving a digital signal, including the steps of: transmitting a digital signal; and receiving the digital signal, wherein the step of transmitting a digital signal includes the steps of: a) receiving a digital video data stream; b) encoding robust data included in the digital video data stream such that the robust data are mapped to one of two groups $\{-5, -3, 1, 7\}$ and $\{-7, -1, 3, 5\}$ each having four levels, to thereby generate an encoded signal; and c) performing VSB modulation of the encoded signal to generate a VSB modulated signal and transmitting the VSB modulated signal.

In accordance with another aspect of the present invention, there is provided a method for transmitting/receiving a digital signal, including the steps of: transmitting a digital signal; and receiving the digital signal, wherein the step of transmitting a digital signal includes the steps of: a) receiving a digital video data stream; b) encoding robust data included in the digital video data stream such that the robust data are mapped to one of two groups $\{-5, -3, 1, 7\}$ and $\{-7, -1, 3, 5\}$ each having four levels, to thereby generate an encoded signal; and c) performing VSB modulation of the encoded signal to generate a VSB modulated signal and transmitting the VSB modulated signal, wherein the step of receiving a digital signal includes the steps of: d) receiving and converting the VSB modulated signal into a baseband signal; e) deciding a level of the robust data based on the group which is used for encoding the robust data in the transmitting apparatus, to thereby generate an equalized signal; and f) performing trellis decoding of the equalized signal based on the group which is used for encoding the robust data in the transmitting apparatus, to thereby generate a trellis decoded signal; and g) decoding the trellis decoded signal to restore the digital video data stream.

In accordance with another aspect of the present invention, there is provided a method for transmitting/receiving a digital signal, including the steps of: transmitting a digital signal; and receiving the digital signal, wherein the step of transmitting a digital signal includes the steps of: a) receiving a digital video data stream; b) encoding robust data included in the digital video data stream such that the robust data are mapped to one of two groups $\{-5, -3, 1, 7\}$ and $\{-7, -1, 3, 5\}$ each having four levels, to thereby generate an encoded signal; and c) encoding the robust data such that the robust data are mapped to a group having 4 levels, other than the two groups; and d) selecting any one between the steps b) and c) to encode the robust data; and e) performing VSB modulation of a signal of the signals encoded in the steps b) and 2), and wherein the step of receiving a digital signal includes the steps of: f) receiving and converting the VSB modulated signal into a baseband signal; g) deciding a level of the robust data based on the group which is used for encoding the robust data in the transmitting apparatus; and h) performing trellis decoding of the robust data, which are resultant signal of the step g) based on one group which is used for encoding the robust data in the transmitting apparatus among the two groups having 4 levels $\{-5, -3, 1, 7\}$ and $\{-7, -1, 3, 5\}$ and 4-level groups other than the two groups, to thereby generate a trellis decoded signal; and i) outputting digital video data stream by decoding the trellis decoded signal.

In accordance with another aspect of the present invention, there is provided a method for transmitting/receiving a digital signal, including the steps of: transmitting a digital signal; and receiving the digital signal, wherein the step of receiving a digital signal includes the steps of: a) receiving and converting the VSB modulated signal into a baseband signal; b) deciding a level of the robust data based on the group which is used for one group used in the VSB transmitting system, among the two groups having 4 levels $\{-5, -3, 1, 7\}$ and $\{-7, -1, 3, 5\}$, when the robust data mapped to one of the two groups having 4 levels are included in the digital video data; c) performing trellis decoding of the robust data, which results from the step b) based on the group which is used for one group used for the VSB transmitting system among the two groups; and d) decoding the resultant signal of the step c) and outputting a digital image data stream.

In accordance with another aspect of the present invention, there is provided a method for transmitting/receiving a digital signal, including the steps of: transmitting a digital signal; and receiving the digital signal, wherein the step of receiving a digital signal includes the steps of: a) receiving and converting the VSB modulated signal into a baseband signal; b) deciding a level of the robust data based on the group which is used for one group used in the VSB transmitting system, among the two groups having 4 levels {−5, −3, 1, 7} and {−7, −1, 3, 5} and groups having 4 levels other than the two groups, when the robust data mapped to one of the two groups having 4 levels are included in the digital video data; c) performing trellis decoding of the robust data, which results from the step b) based on the group which is used for one group used for the VSB transmitting system among the two groups; and d) decoding the resultant signal of the step c) and outputting a digital image data stream.

BRIEF DESCRIPTION OF THE DRAWINGS

The above and other objects and features of the present invention will become apparent from the following description of the preferred embodiments given in conjunction with the accompanying drawings, in which.

BEST MODE FOR CARRYING OUT THE INVENTION

Figure 1:
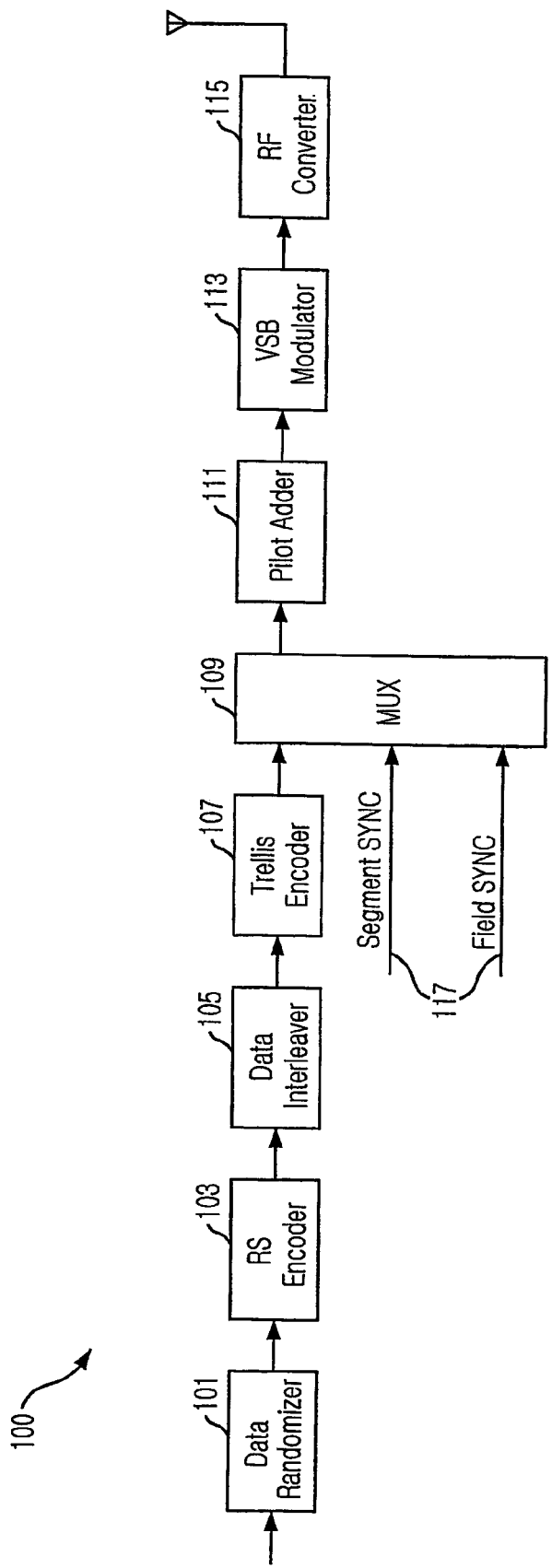
FIG. 1 is a block diagram illustrating a typical Digital Television (DTV) transmitter.

In accordance with the present invention, normal data are transmitted and received in the form of 8-Vestigial Side Band (VSB), and robust data are transmitted and received in the form of a particular 4-VSB symbol {−5, −3, 1, 7} or {−7, −1, 3, 5}. Among 312 data segments of a data field, if a particular 4-VSB robust data {−5, −3, 1, 7} or {−7, −1, 3, 5} is transmitted to some segments instead of a normal data packet, accuracy in error signal computation, which is for updating a tap coefficient of an equalizer with respect to the transmitted 4-VSB robust data, and trellis decoding is raised. Therefore, the signal-to-noise ratio (SNR) of 4-VSB robust data is reduced and the reception performance of 8-VSB normal data is improved.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

Similarly, a switch described in the drawings may be presented conceptually only. The function of the switch should be understood to be performed manually or by controlling a program logic or a dedicated logic or by interaction of the dedicated logic. A particular technology can be selected for deeper understanding of the present specification by a designer.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

Figure 4:
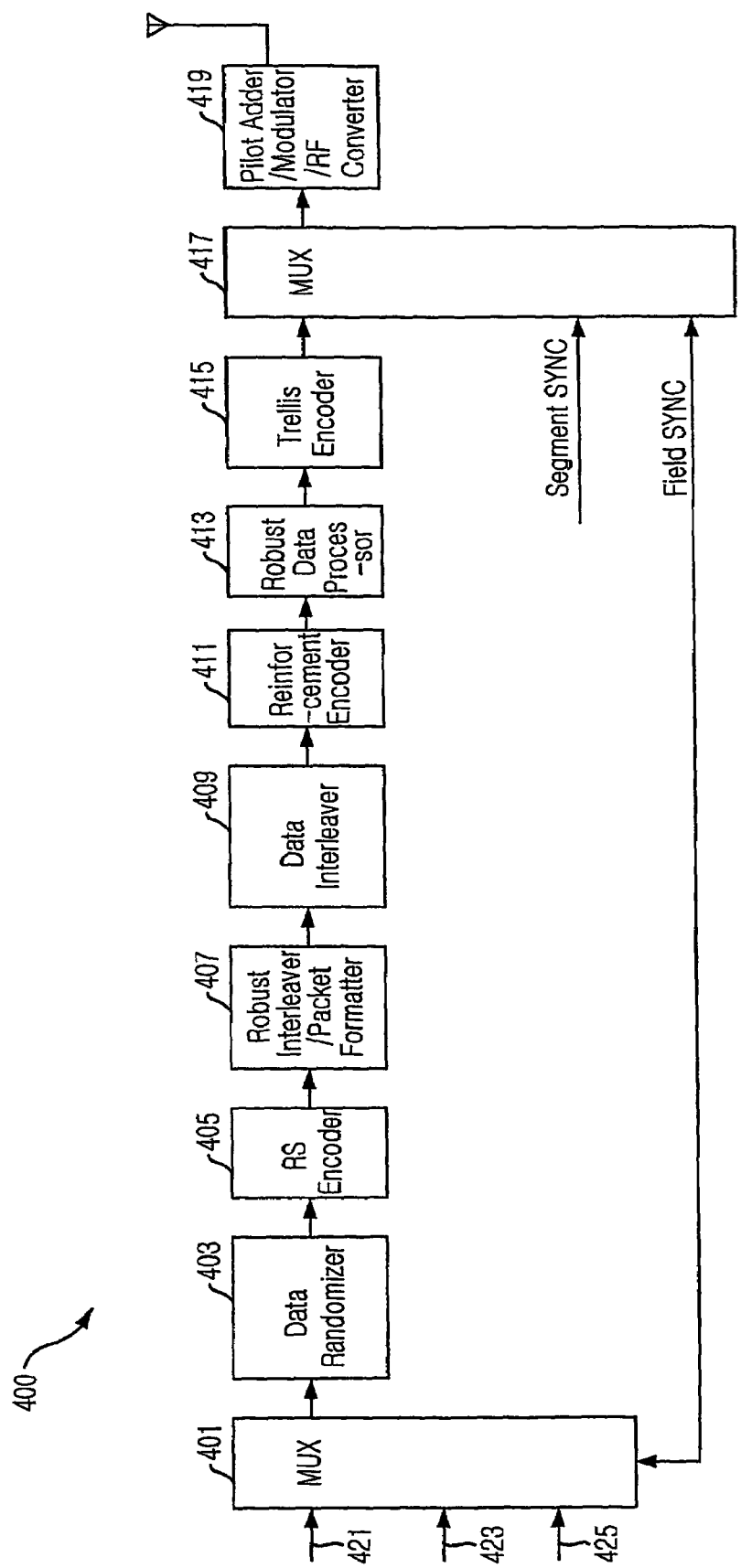
FIG. 4 is a block diagram describing a DTV transmitter in accordance with an embodiment of the present invention.

FIG. 4 is a block diagram describing a DTV transmitter in accordance with an embodiment of the present invention.

Referring to the drawing, the transmitter 400 includes a first multiplexer 401, a data randomizer 403, a Reed Solomon (RS) encoder 405, a robust interleaver/packet formatter 407, a data interleaver 409, a reinforcement encoder 411, a robust data processor 413, a trellis encoder 415, a second multiplexer 417, and a pilot adder/modulator/radio frequency (RF) converter 419.

In accordance with the present invention, normal data are mapped to a group expressed in 8 levels, for example, $\{-7, -5, -3, -1, 1, 3, 5, 7\}$, and robust data are mapped to a group between two groups expressed in 4 levels, e.g., $\{-5, -3, 1, 7\}$ or $\{-7, -1, 3, 5\}$.

This technology can be joined with technology that maps robust data to a group of another group also expressed in 4 levels, such as, $\{-7, -5, 5, 7\}$ or $\{-7, -3, 3, 7\}$ with its own technological conception remaining intact. In that case, it is needed to include a selecting means for selecting one signal path between a signal path encoding the robust data to map the robust data to a mapping group $\{-5, -3, 1, 7\}$ or $\{-7, -1, 3, 5\}$, which is presented in the present invention, and a signal path encoding the robust data to map the robust data to another mapping group, e.g., $\{-7, -5, 5, 7\}$ or $\{-7, -3, 3, 7\}$. According to which signal path is selected, the robust data can be mapped to any one between the two groups expressed in 4 levels, $\{-5, -3, 1, 7\}$ or $\{-7, -1, 3, 5\}$, or another group of 4 levels, $\{-7, -5, 5, 7\}$ or $\{-7, -3, 3, 7\}$.

The elements illustrated in FIG. 4, the data randomizer 403, RS encoder 405, data interleaver 409, trellis encoder 415, second multiplexer 417, and pilot adder/modulator/radio frequency (RF) converter 419, are the same as the conventional ones, the data randomizer 101, RS encoder 103, data interleaver 105, trellis encoder 107, multiplexer 109, and pilot adder 111, VSB modulator 113, and RF converter 115.

The first multiplexer 401 multiplexes normal data packets 421 to be converted into 8-level symbols and robust data packets 423 to be converted into 4-level symbols, such as $\{-5, -3, 1, 7\}$ or $\{-7, -1, 3, 5\}$, according to the control of robust data flag signals 425.

The normal data packets 421 and the robust data packets 423 are serial data streams formed of 188-byte MPEG-compatible data packets. Both data packets 421 and 423 have the same properties except that the robust data packets 423 include information packets and null packets.

The null packets are formed of arbitrary data having a null packet header, such as "0." They are added to secure packet space to be expanded according to a coding rate of robust data. In the present specification, the present invention will be described mainly taking an example where the coding rate of robust data is ½. This, however, does not mean that the present invention is limited to the coding rate of ½.

The robust data flag signals 425 are generated in an external device (not shown) according to the ratio of robust data to normal data (NRP, refer to Equation 1) within one field and the coding rate of robust data, e.g., ½ or ¼. Other elements of the transmitter 400 including the first multiplexer 401 use the robust data flag signals 425 to check out if the data processed currently are robust data packets.

The first multiplexer 401 multiplexes the normal data packets 421, the robust data packets 423, and the robust data flag signals 425 according to the number of robust data packets per field. In accordance with an embodiment of the present invention, the positions of the robust data packets can be defined according to their number as Equation 1.

$0 \leq NRP/2 \leq 39$:

$\{s \mid s = 4i, i = 0, 1, \ldots, NRP - 1\}, (0 \leq s \leq 156)$ $40 \leq NRP/2 \leq 78$:

$\{s \mid s = 4i, i = 0, 1, \ldots, 77\} U \{s \mid s = 4i + 2, i = 0, 1, \ldots, NRP - 79\}$ $79 \leq NRP/2 \leq 117$:

$\{s \mid s = 4i, i = 0, 1, \ldots, 77\} U \{s \mid s = 4i + 2, i = 0, 1, \ldots, 77\}$ $U \{s \mid s = 4i + 1, i = 0, 1, \ldots, NRP - 157\}$ $118 \leq NRP/2 \leq 156$:

$\{s \mid s = 4i, i = 0, 1, \ldots, 77\} U \{s \mid s = 4i + 2, i = 0, 1, \ldots, 77\}$ $U \{s \mid s = 4i + 1, i = 0, 1, \ldots, 77\} U \{s \mid s = 4i, i = 0, 1, \ldots, NRP - 235\}$ Equation 1 where NRP stands for the number of robust segments occupied by robust data packets for each data field. In other words, NRP is the number of robust data packets within a frame. As mentioned above, it is a value including the number of all the information packets and null packets. The value, NRP, is a figure in the range of 0~311.

In accordance with another embodiment of the present invention, the position of a robust data packet can be determined as Equation 2:

$RPI = 312/NRP$ $RPP = \text{floor}(RPI \times r)$  Equation 2

Where RPI stands for Robust data Packet Interval, and RPP stands for Robust data Packet, while floor (*) denotes decimal cut-out computation in which digits under the decimal point is abandoned. Here, r is an integer between 0 and the NRP.

According to Equation 2, when NRP is 162 and the robust data coding rate is ½, the positions of normal data and robust data within a data field are determined as Table 1.

TABLE 1

| Packet Number | Type of Packet |
|---|---|
| 0 | Robust |
| 1 | Robust (null) |
| 2 | Normal |
| 3 | Robust |
| 4 | Normal |
| 5 | Robust (null) |
| 6 | Normal |
| 7 | Robust |
| 8 | Normal |
| 9 | Robust (null) |
| 10 | Normal |
| 11 | Robust |
| 12 | Normal |
| 13 | Robust (null) |
| 14 | Normal |
| 15 | Robust |
| ... | ... |
| 297 | Normal |
| 298 | Robust |
| 299 | Normal |
| 300 | Robust (null) |
| 301 | Normal |
| 302 | Robust |
| 303 | Normal |
| 304 | Robust (null) |
| 305 | Normal |
| 306 | Robust |
| 307 | Normal |

TABLE 1-continued

| Packet Number | Type of Packet |
|---|---|
| 308 | Robust (null) |
| 309 | Normal |
| 310 | Robust (null) |
| 311 | Normal |

The normal data packets 421 and robust data packets 423 that are multiplexed on a packet basis in the first multiplexer 401 are randomized in the data randomizer 403. Each packet is encoded to include 20-byte parity information for FEC in the RS encoder 405. In the RS encoder 405, a total of 207 bytes of data are generated for each segment by adding 20 RS parity bytes for FEC to 187-byte data. The robust data flag signals do not go through the randomization and the RS encoding. If RS encoding is performed and 20 RS parity bytes are added to the robust data, robust data flags are expressed with respect to the added RS parity bytes.

Subsequently, the normal/robust data packets that are included in the consecutive segments of each data and RS encoded are inputted to the robust interleaver/packet formatter 407. Then, interleaving is performed only on the robust data (information packet) based on the robust data flag. The interleaved robust data are reconstructed into 207-byte packets according to the robust data coding rate. The reconstructed robust data packets are multiplexed with normal data packets. The normal data packets have a predetermined delay to be multiplexed with the robust data packets.

Figure 5:
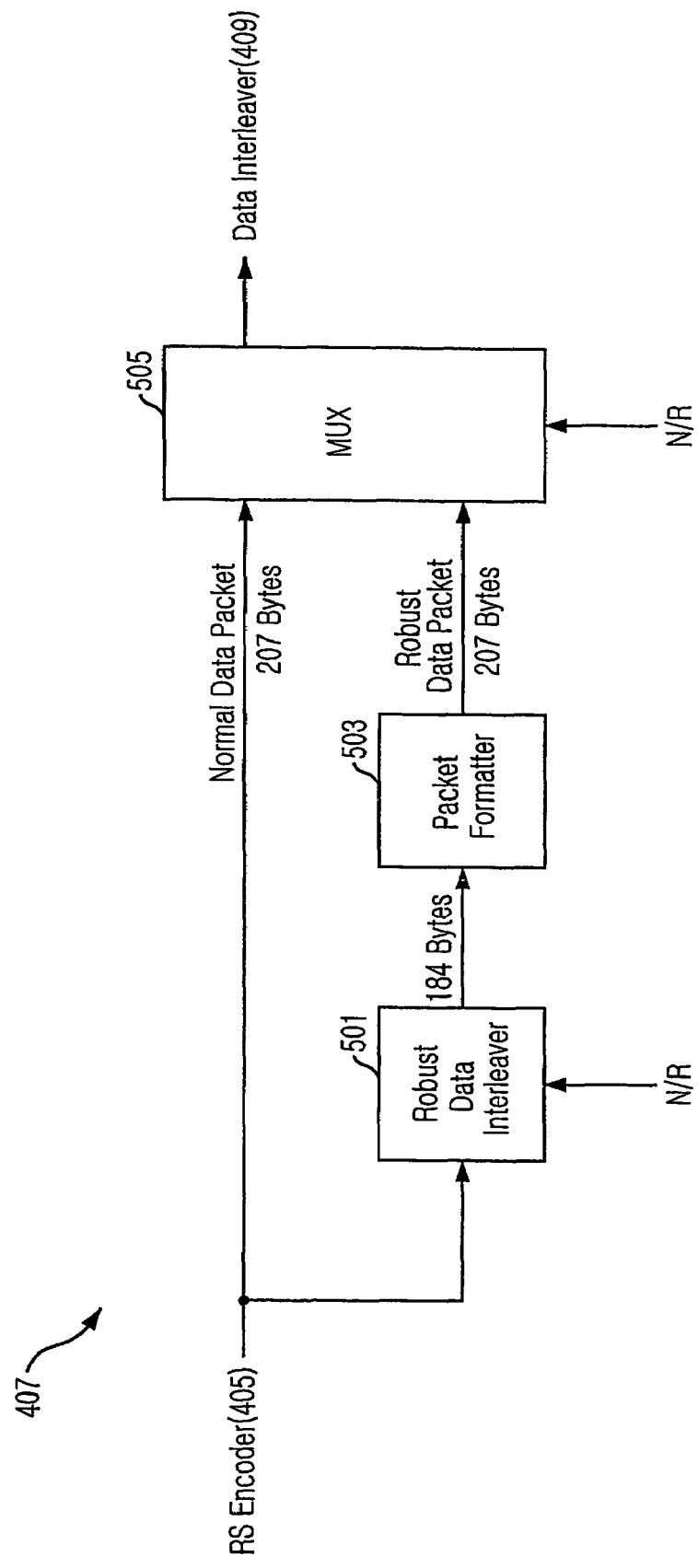
FIG. 5 is a block diagram illustrating a robust interleaver/packet formatter in FIG. 4.

FIG. 5 is a block diagram illustrating a robust interleaver/packet formatter in FIG. 4. Referring to FIG. 5, the robust interleaver/packet formatter 407 includes a robust data interleaver 501, a packet formatter 503, and a third multiplexer 505.

The robust data interleaver 501 carries out interleaving only on the robust data packets according to the robust data flag signals.

Figure 6:
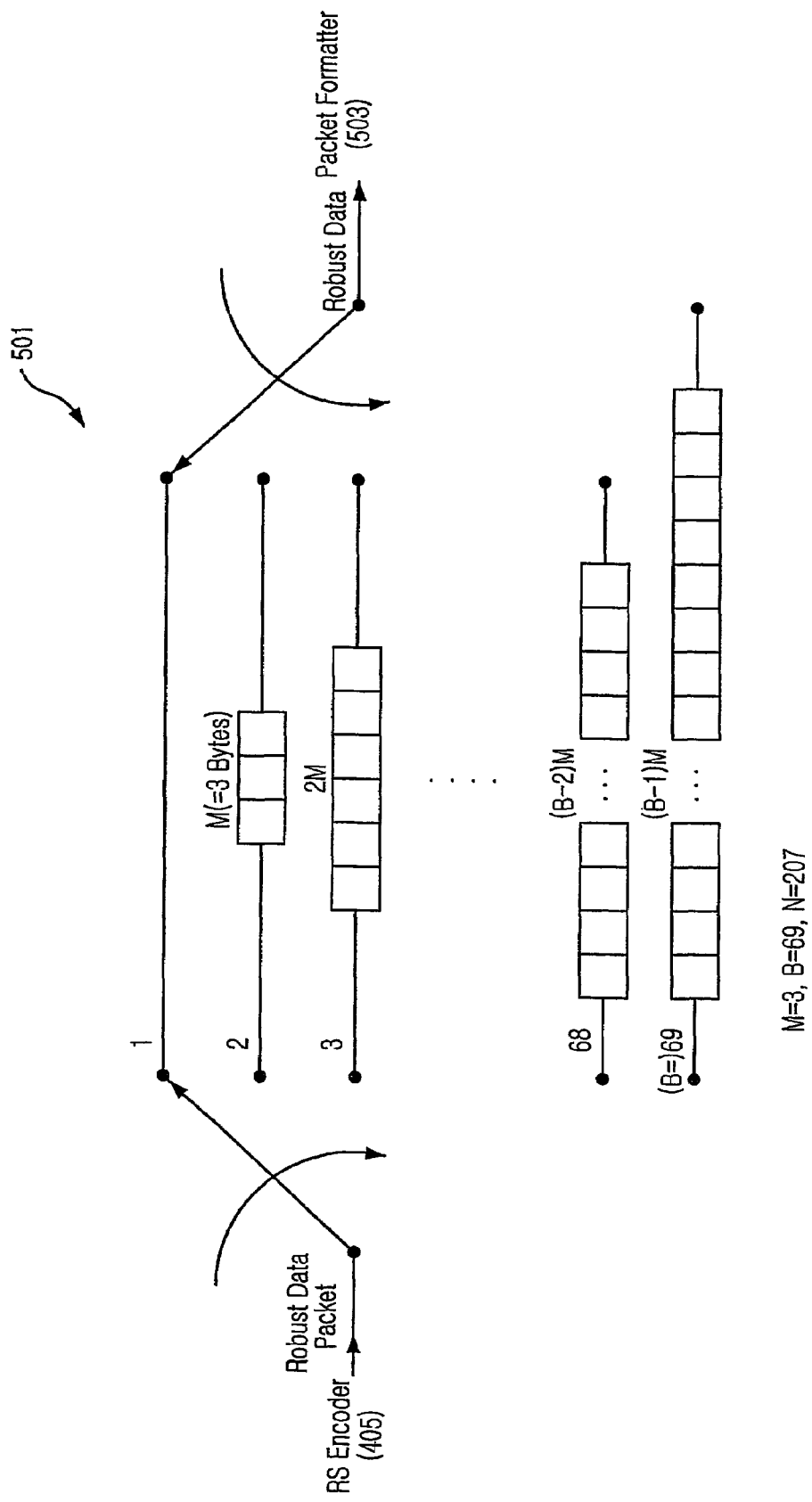
FIG. 6 is a diagram describing a robust data interleaver in FIG. 5.

FIG. 6 is a diagram describing a robust data interleaver in FIG. 5. Referring to FIG. 6, the robust data interleaver 501 receives signals on a byte basis from the robust data packets among the data packets inputted from the RS encoder 405, performs interleaving, and transmits the robust data to the packet formatter 503. Also, the robust data interleaver 501 has parameters M=3, B=69 and N=207. Thus, it can perform interleaving by receiving one byte from each of 69 different packets maximally. During the interleaving, null packets are dismissed and only the information packets are interleaved in the robust data packets.

The packet formatter 503 in FIG. 5 processes the robust data interleaved by the robust data interleaver 501. The packet formatter 503 receives 184 bytes from the robust data interleaver 501 and generates two 207-byte data blocks with respect to a 184-byte robust data. Each byte of the generated 207-byte data blocks includes 4 bits, for example, LSB (6, 4, 2, 0).

The 4 bits correspond to the inputted robust data. The other 4 bits, e.g., MSB (7, 5, 3, 1), are established into arbitrary numbers. In a 207-byte data blocks, header byte data to be described later and arbitrary information data for RS parity bytes are inserted to the byte positions that do not correspond to the 184-byte robust data.

Subsequently, the packet formatter 503 adds a header corresponding to a null packet to the first 3 bytes of each of the generated 207-byte data blocks. The packet formatter 503 generates 207-byte packets by adding 20-byte arbitrary information, such as "0", to each data block. As to be described later on, the robust data formatter 413 replaces the 20-byte arbitrary information with RS parity information.

All the other remaining byte positions are filled with the bytes of the 184-byte robust data sequentially. The packet formatter 503 checks out if a byte position is a place for a particular parity byte, before it adds the robust data to each of the newly generated 207-byte data blocks. If the byte place is not a place for a parity byte, the robust data byte is placed in the byte position. If the byte position is a place for a parity byte, the byte position is skilled and the next byte position is checked out. This process is repeated until all the robust data bytes are placed in a 207-byte data block which is generated in the above.

If four 207-byte robust data packets are robust-interleaved and inputted to the packet formatter 503, the packet formatter 503 outputs 9 207-byte packets including robust data bytes, header bytes, and arbitrary data bytes for RS parity bytes. Each of the outputted 9 207-packets includes 92 bytes of robust data inputted to the packet formatter 503.

Meanwhile, the positions of the arbitrary information data bytes for RS parity bytes of each packet are determined based on Equation 3:

$$m=(52 \times n+(s \bmod 52)) \bmod 207 \quad \text{Equation 3}$$

wherein m denotes the number of an output byte, i.e., a position of a packet expanded into 207 bytes;

n denotes an input byte in the range of 0 to 206 (n=0~206), i.e., a byte number of each packet; and s denotes a segment corresponding to robust data in a data field and having a range of 0 to 311 (s=0~311), i.e., a packet number.

The position of a parity byte, i.e., m, can be calculated with respect to n (n=187~206) so that the positions of 20 parity packets for each packet could always correspond to the last 20 bytes of the packet. Here, the n value corresponds to the last 20 bytes of the packet.

For example, if k equals to 0 (k=0) and n has a range of 187 to 206 (n=187~206), the position of a parity byte for a packet 0 is 202, 47, 99, 151, 203, 48, 100, 152, 204, 49, 101, 153, 205, 50, 102, 154, 206, 51, 103, 155. This means that the position of the parity byte after the interleaving in the data interleaver 411 can come to packets from 187 to 206, only when the position of the parity byte is the $202^{nd}$ byte.

Similarly, the position of another parity byte should be the $47^{th}$ byte. According to Equation 3, however, a parity byte can be placed in a position of a packet header byte. That is, m can be 0, 1 and/or 2. Therefore, to avoid a situation where a parity byte comes to the position for a packet header byte, the range of n can be raised as much as the number of parity bytes that are placed in a header position, up to 3. Accordingly, if a resultant value of s mod 52 is any one in the range of 1 to 7 in the calculation for obtaining 20 m values, part of the 20 m values is 0, 1 and/or 2.

For example, if s mod 52 remains 0 (s mod 52=0), all the 20 m values do not indicate the position 0, 1, or 2 of the header bytes. Therefore, all the 20 m values can be the positions for parity bytes.

On the contrary, if s mod 52 remains 1 (s mod 52=1), one of the 20 m values becomes 0, which indicates the position of the header byte. In this case, the range of n is increased by 1 to be from 186 to 206. Therefore, 21 m values are calculated and the m values that come to the positions for the header bytes are abandoned. The remaining 20 m values are designated as the positions for parity bytes.

Likewise, if s mod 52 equals to 2 (s mod 52=2), two among the 20 m values become 0 and 1, which indicate the positions for the header bytes. In this case, the range of n is increased by 2 to be from 185 to 206. Therefore, 22 m values are calculated and the m values that are the positions for the header bytes, 0 or 1, are abandoned. The remaining 20 m values are designated as the positions for parity bytes.

Table 2 shows the range of n based on the position of a robust data segment.

TABLE 2

| s mod 52 | Number of m needed additionally | Range of n |
| --- | --- | --- |
| 0 | 0 | 187~206 |
| 1 | 1 | 186~206 |
| 2 | 2 | 185~206 |
| 3 | 3 | 184~206 |
| 4 | 3 | 184~206 |
| 5 | 3 | 184~206 |
| 6 | 2 | 185~206 |
| 7 | 1 | 186~206 |
| 8~51 | 0 | 187~206 |

The third multiplexer 505 in FIG. 5 multiplexes the robust data packets and the normal data packets that are outputted from the packet formatter 503 according to robust data flags. The operation of the third multiplexer 505 is the same as that of the first multiplexer 401.

Referring back to FIG. 4, the data interleaver 409 interleaves the data packets within the consecutive segments of each data field to scramble the sequential order of the robust data flag, normal data stream, and robust data stream, and thus outputs scrambled data. The structure of the data interleaver 409 is similar to that of the robust data interleaver 501 (see FIG. 6, M=4, B=52, N=208).

Figure 7:
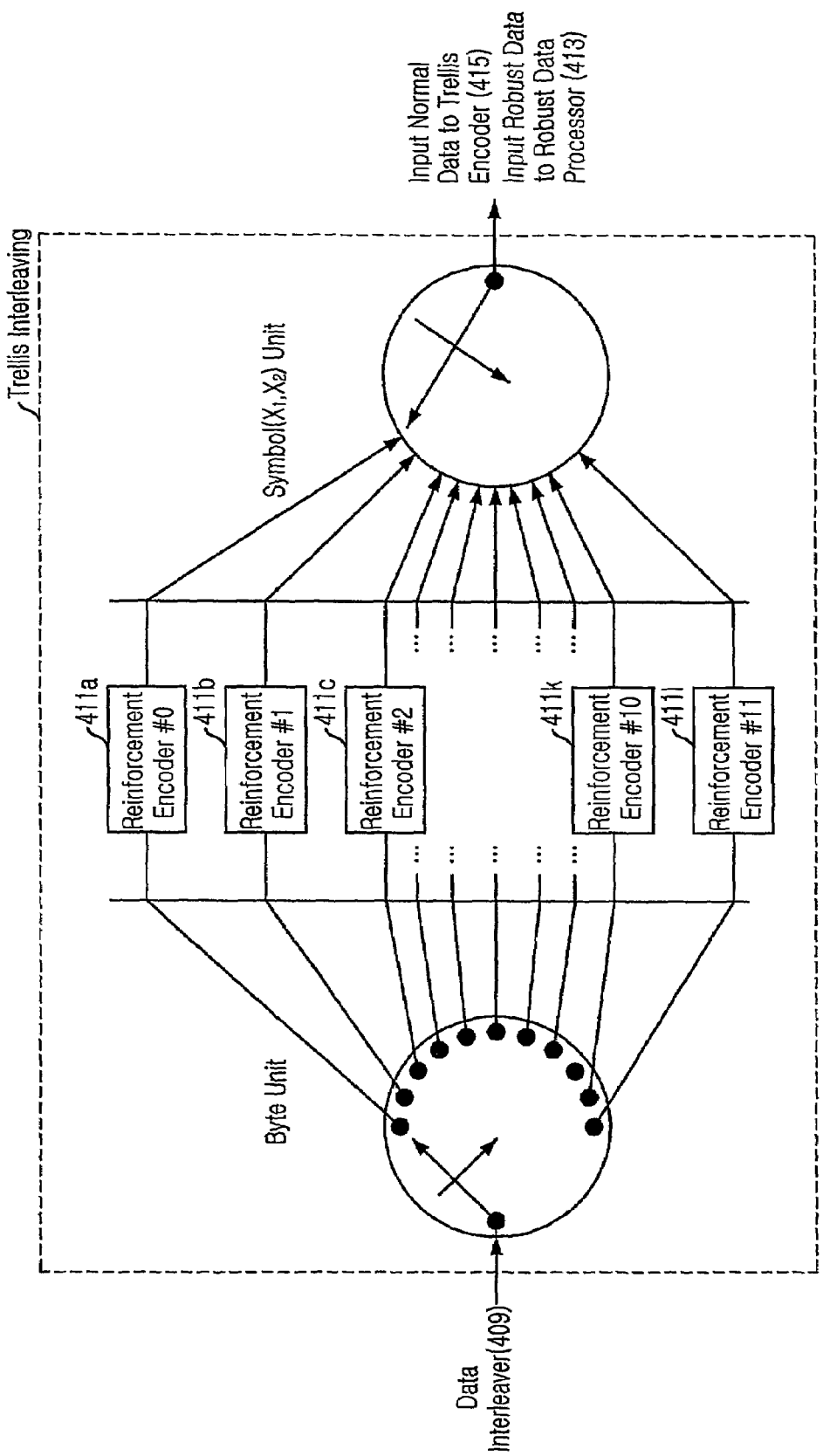
FIG. 7 is a diagram depicting a structure of a reinforcement encoder in FIG. 4.

FIG. 7 is a diagram depicting a structure of a reinforcement encoder in FIG. 4. Referring to FIG. 7, the reinforcement encoder 411 includes a plurality of identical encoders, for example, 12 identical encoders 411a to 411l, i.e., 12 identical reinforcement encoders, formed in parallel. The reinforcement encoder 411 performs trellis interleaving on the interleaved normal/robust data and robust data flag and encodes the normal/robust data based on the trellis-interleaved robust data flag.

The normal/robust data outputted from the data interleaver 409 are inputted into the 12 encoders 411a to 411l on a byte basis sequentially. The reinforcement encoder 411 encodes 2-bit ($X_1'$, $X_2'$) normal/robust data into 2-bit ($X_1$, $X_2$) normal/ robust data. For example, the inputted bit $X_2'$ is an MSB (7, 5, 3, 1) code word, and the inputted bit $X_1'$ is an LSB (6, 4, 2, 0) code word.

As described before, both of the MSB (7, 5, 3, 1) and the LSB (6, 4, 2, 0) of normal data include information data. The LSB (6, 4, 2, 0) of robust data includes information data, while the MSB (7, 5, 3, 1) of robust data includes arbitrary values.

Among the encoded data symbols of the reinforcement encoder 411, normal data symbols are inputted to the trellis encoder 415 by bypassing the robust data processor 413. The robust data symbols are inputted to the trellis encoder 415 after passing through the robust data processor 413. During the process, the data symbols encoded in the 12 reinforcement encoders 411a to 411l are inputted to the trellis encoder 415 or the robust data processor 413 sequentially. In overall, trellis interleaving is carried out.

Referring to FIG. 4 again, the trellis encoder 415 is the same as a trellis encoder defined in the ATSC A/53 Standards. Just as the reinforcement encoder 411, the trellis encoder 415 is also formed of a plurality of encoders 415a to 415l, for example, 12 encoders, formed in parallel, which is not shown in the drawing though.

The normal data bits $(X_1, X_2)$ or the robust data bits $(X_1, X_2)$ are inputted to the 12 encoders 415a to 415l, i.e., 12 trellis encoders. The trellis encoder 415 trellis-encodes the inputted bits $(X_1, X_2)$ into 8-level symbols (in case of normal data, {−7, −5, −3, −1, 1, 3, 5, 7}) or 4-level (in case of robust data) symbols.

Here, the normal data bits $(X_1, X_2)$ are inputted to the trellis encoder 415 by bypassing the robust data processor 413, and the robust data bits $(X_1, X_2)$ are inputted to the trellis encoder 415 by passing through the robust data processor 413. The 8-level symbols (normal data) or the 4-level symbols (in case of robust data, {−5, −3, 1, 7} or {−7, −1, 3, 5}) which are encoded by the respective 12 trellis encoders 415a to 415l are inputted to the second multiplexer 417 sequentially. In overall, trellis interleaving is carried out.

Figure 8:
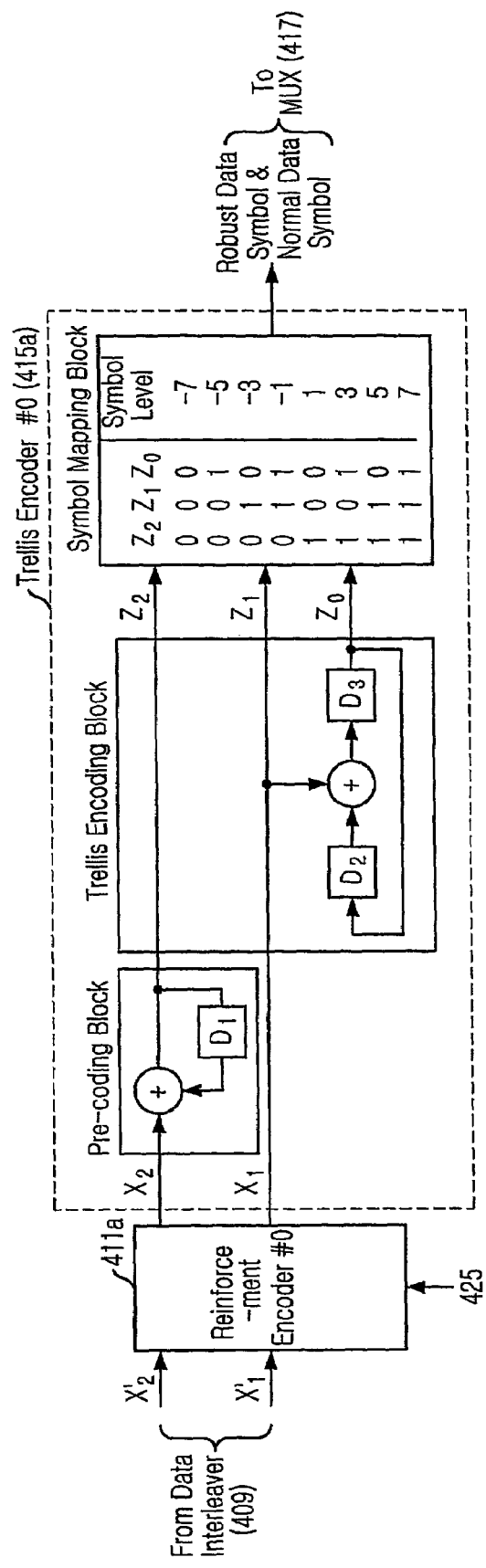
FIG. 8 is a diagram showing the reinforcement encoder and a trellis encoder of FIG. 4 to describe a process that normal data are outputted in the form of a 8-level symbol and robust data are outputted in the form of a 4-level symbol in accordance with the embodiment of the present invention.

FIG. 8 is a diagram showing the reinforcement encoder and a trellis encoder of FIG. 4 to describe a process that normal data are outputted in the form of a 8-level symbol and robust data are outputted in the form of a 4-level symbol in accordance with the embodiment of the present invention. As will be described later, the robust data processor 413 processes only robust data and it is not involved in the process that outputs 8-level or 4-level symbols. Thus, FIG. 8 presents a conceptual connection between a reinforcement encoder #0 411a and a trellis encoder #0 415a.

As defined in the ATSC A/53 Standards currently, the trellis encoder 415 includes a pre-coding block, a trellis encoding block, and a symbol mapping block. Each of the pre-coding block and the trellis encoding block includes a register $D_1, D_2$ and $D_3$ for storing symbol delay values, for example, 12 symbol delay values.

The reinforcement encoder #0 411a encodes the 2-bit $(X_1', X_2')$ normal/robust data inputted from the data interleaver 409 into 2-bit $(X_1, X_2)$ normal/robust data. The trellis encoder #0 415a outputs 8-level symbols (in case of normal data, {−7, −5, −3, −1, 1, 3, 5, 7}) or 4-level symbols (in case of robust data, {−5, −3, 1, 7} or {−7, −1, 3, 5}) to the second multiplexer 417 according to the trellis encoded bits $Z_0, Z_1$ and $Z_2$ that correspond to the 2-bit $(X_1, X_2)$ normal/robust data.

Figure 9:
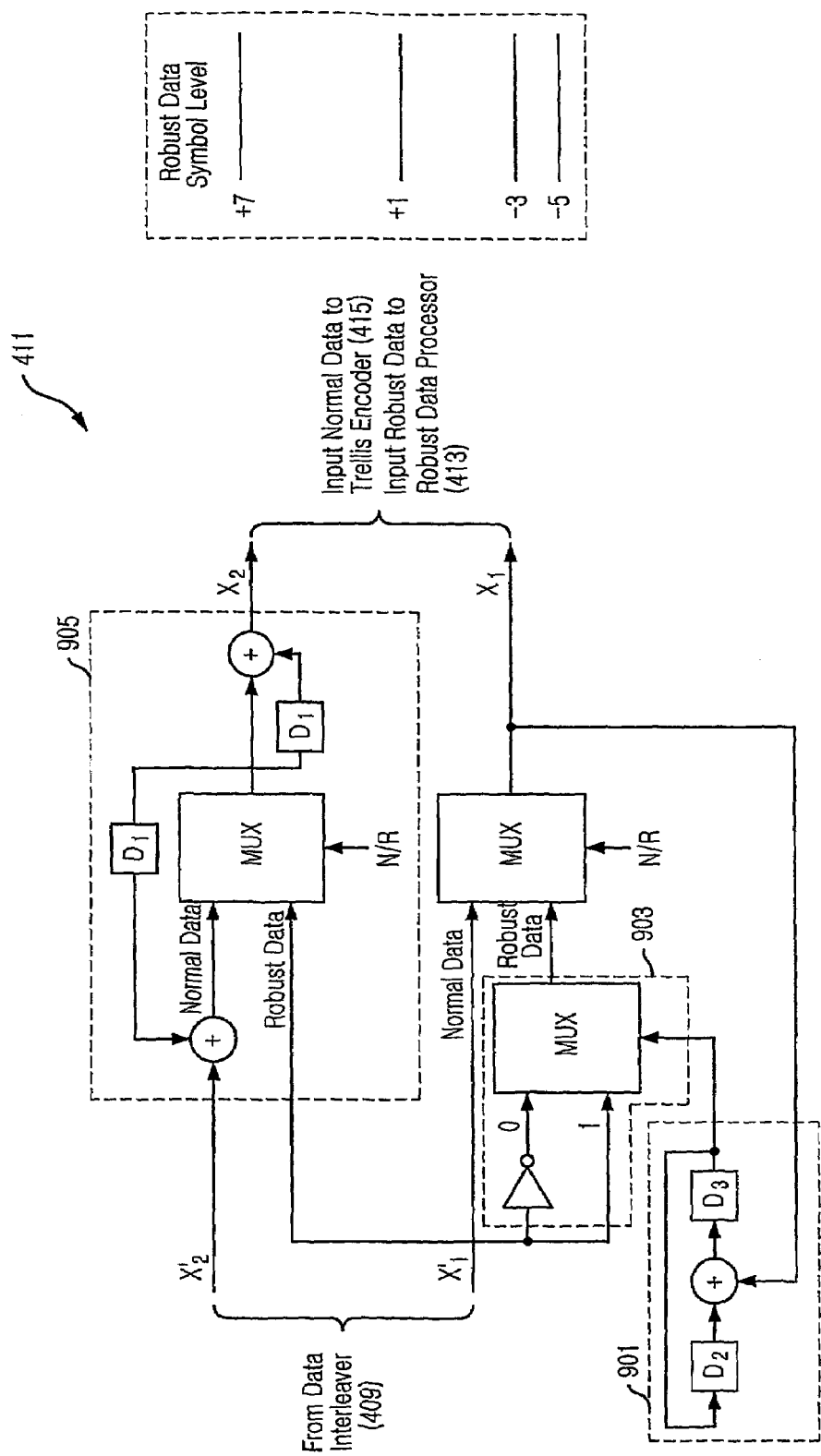
FIG. 9 is a block diagram illustrating the reinforcement encoder encoding robust data into 2-bit ($X_1$, $X_2$) normal/robust data symbols so that the trellis encoder of FIG. 4 could output 4-level signals of {−5, −3, 1, 7} in accordance with the embodiment of the present invention.
Figure 10:
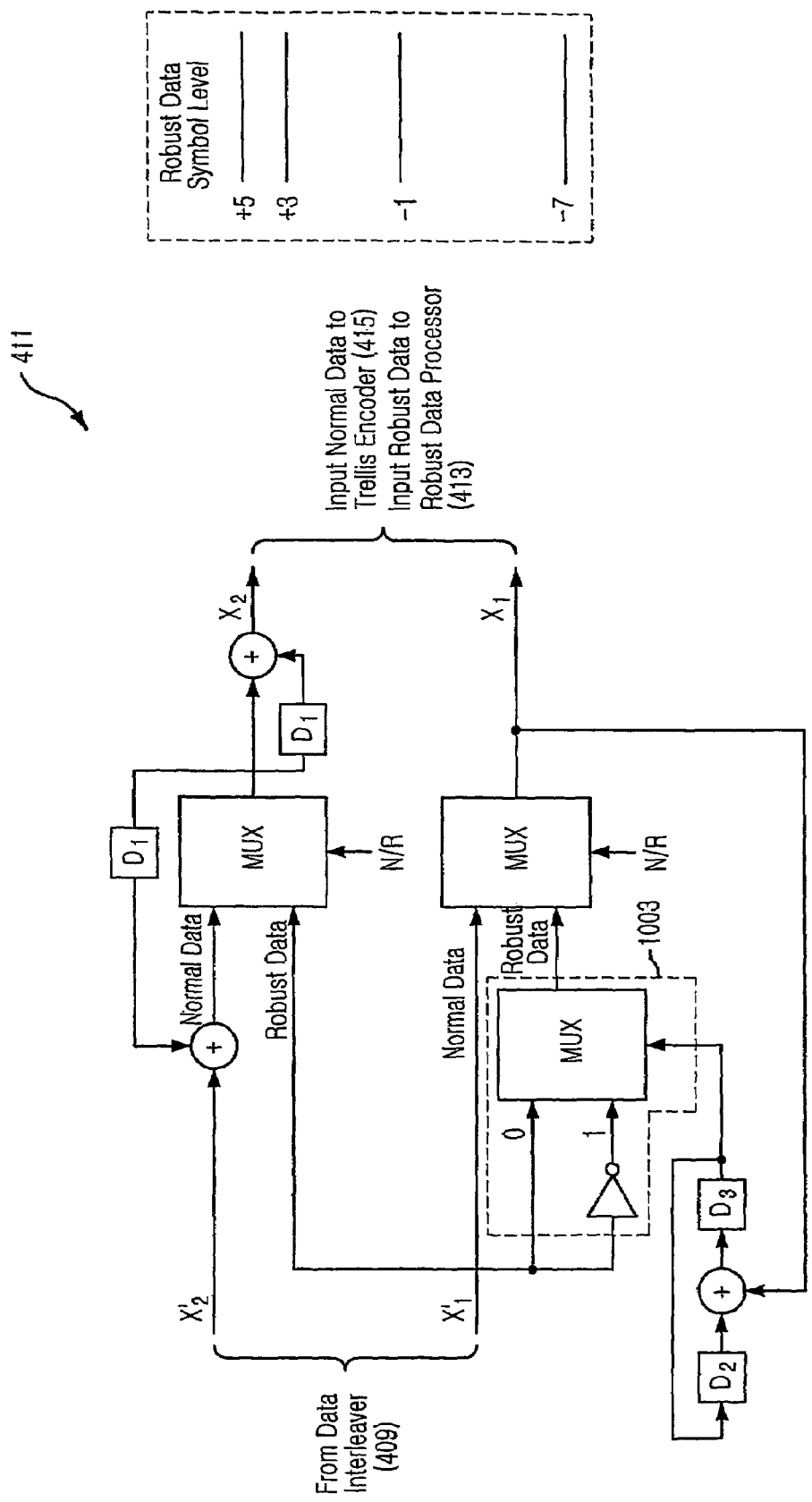
FIG. 10 is a block diagram describing the reinforcement encoder encoding robust data into 2-bit ($X_1$, $X_2$) normal/robust data symbols so that the trellis encoder of FIG. 4 could output 4-level signals of {−7, −1, 3, 5} in accordance with the embodiment of the present invention.
Figure 11:
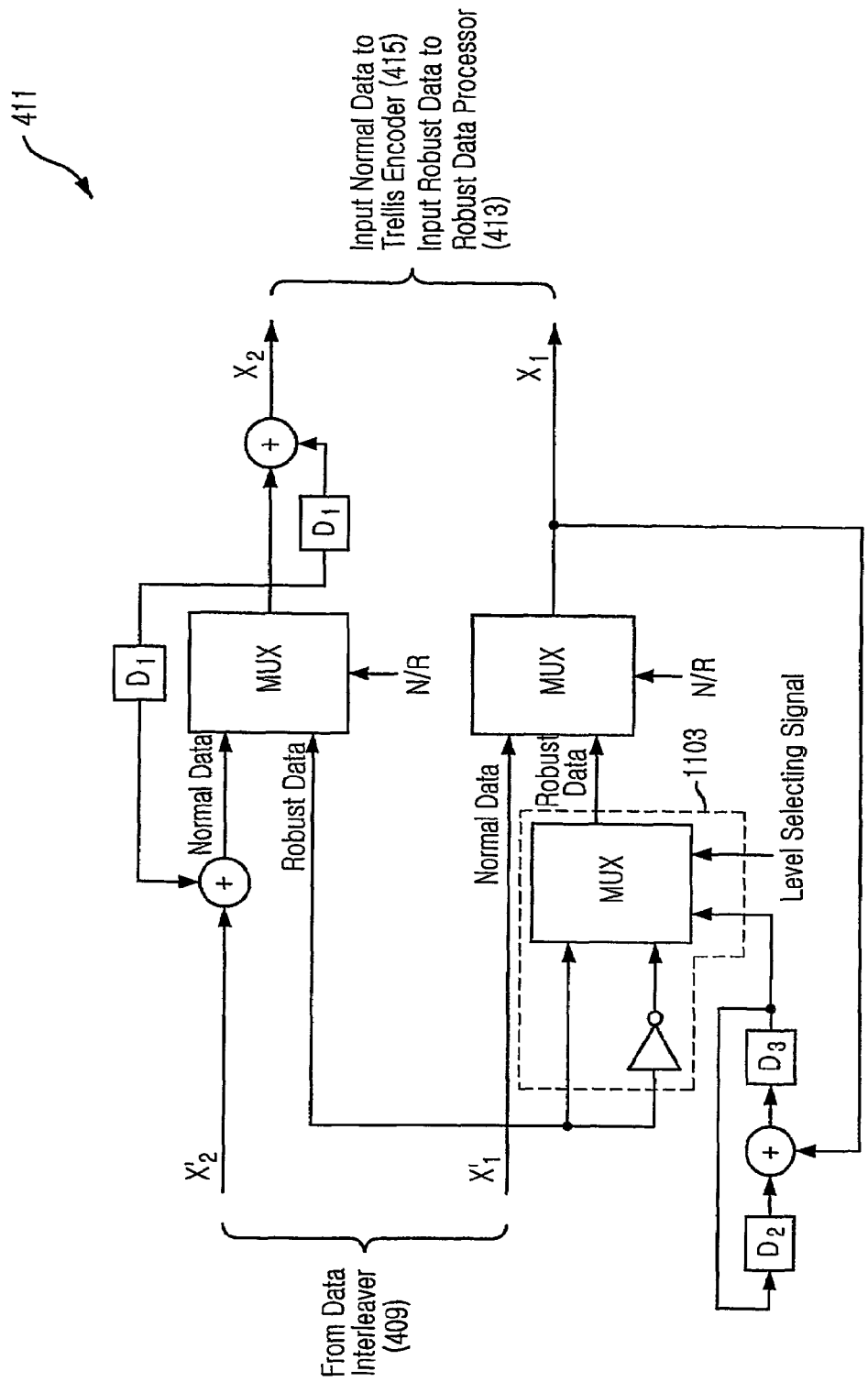
FIG. 11 is a block diagram showing the reinforcement encoder encoding robust data into 2-bit ($X_1$, $X_2$) normal/robust data symbols so that the trellis encoder of FIG. 4 could output 4-level signals of {−5, −3, 1, 7} or {−7, −1, 3, 5} selectively in accordance with the embodiment of the present invention.
Figure 12:
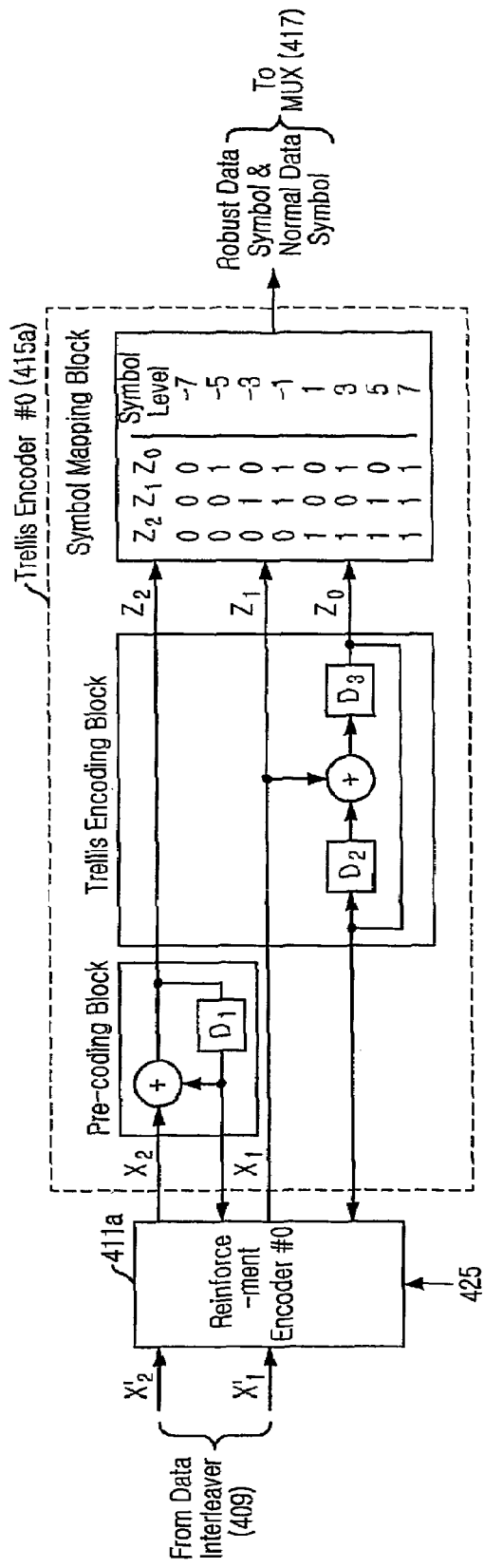
FIG. 12 is a diagram showing the reinforcement encoder and the trellis encoder of FIG. 4 to describe a process where normal data are outputted in the form of 8-level symbols and robust data are outputted in the form of 4-level data symbols in accordance with another embodiment of the present invention.
Figure 13:
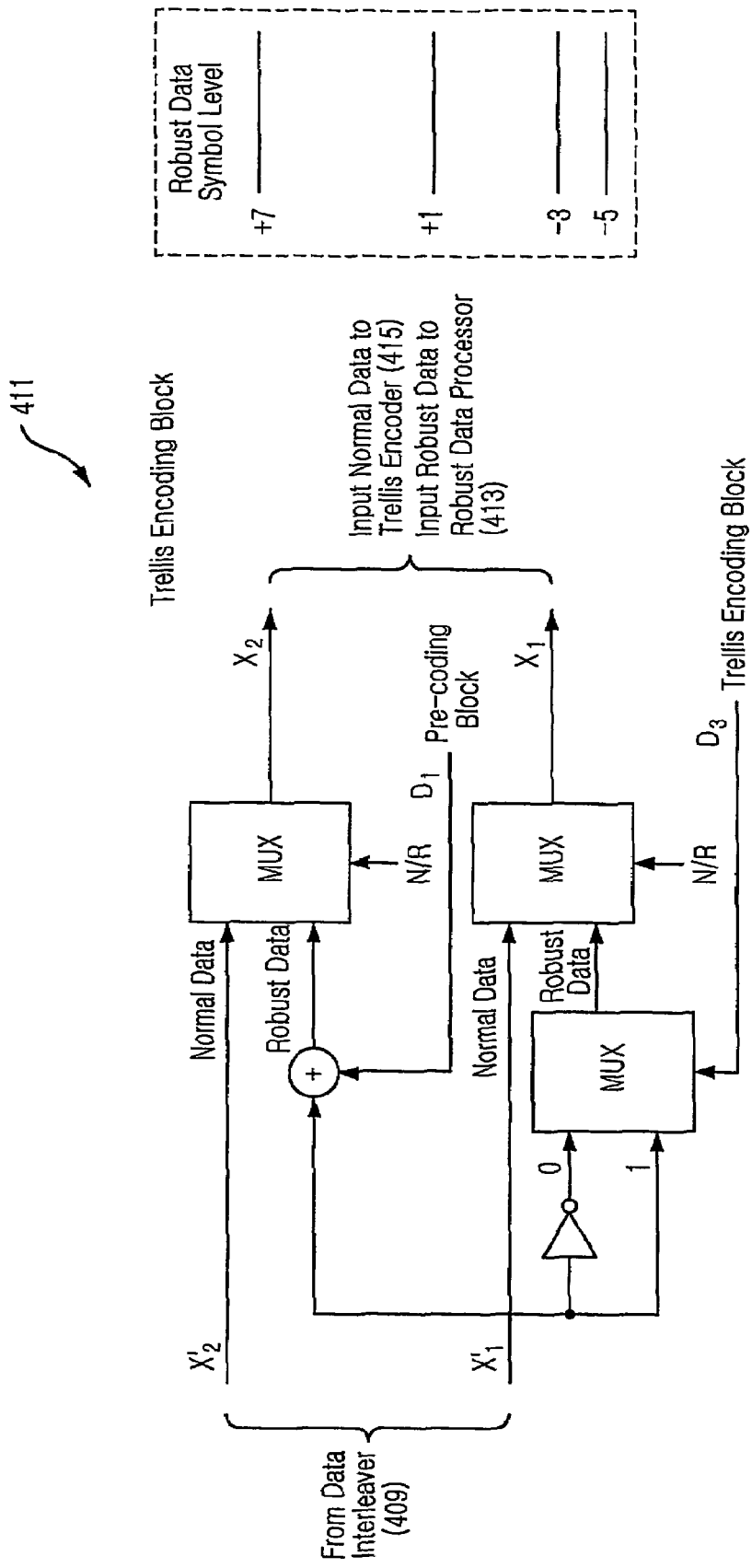
FIG. 13 is a block diagram describing the reinforcement encoder coding data into 2-bit ($X_1$, $X_2$) normal/robust data symbols so that the trellis encoder of FIG. 4 could output 4-level signals of {−5, −3, 1, 7} with respect to robust data in accordance with another embodiment of the present invention.
Figure 14:
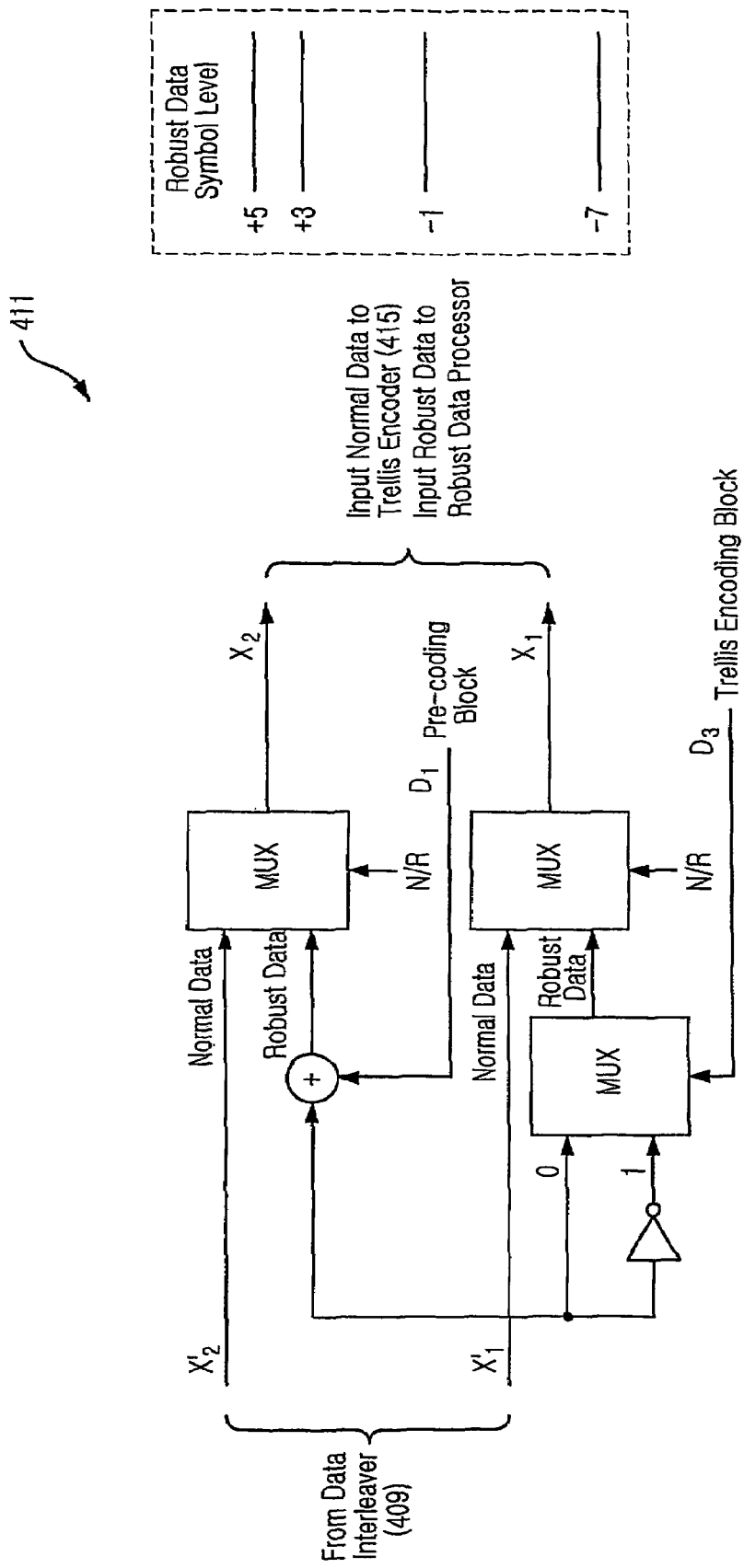
FIG. 14 is a block diagram describing the reinforcement encoder coding data into 2-bit ($X_1$, $X_2$) normal/robust data symbols so that the trellis encoder of FIG. 4 could output 4-level signals of {−7, −1, 3, 5} with respect to robust data in accordance with the embodiment of the present invention.
Figure 15:
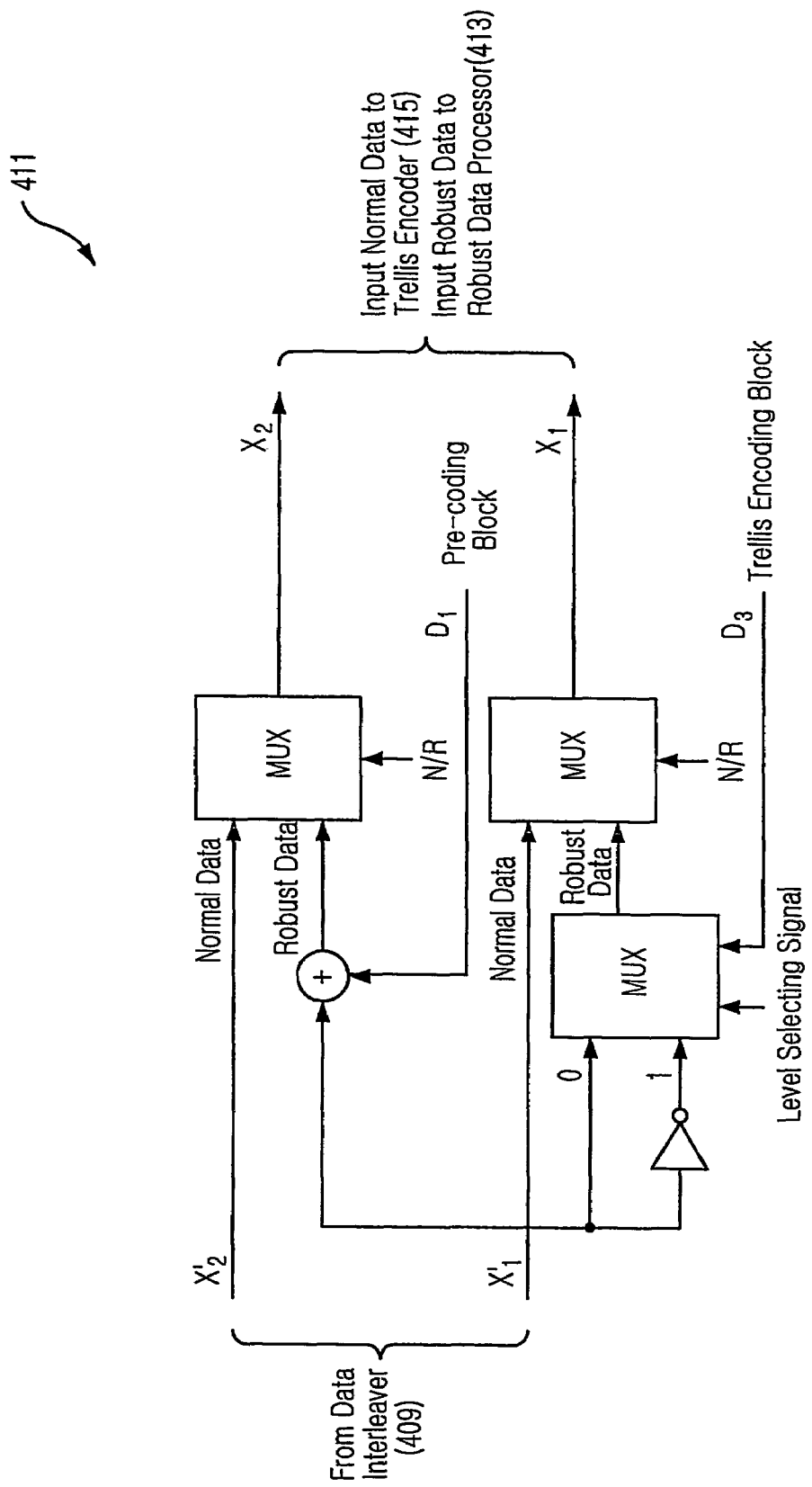
FIG. 15 is a block diagram showing the reinforcement encoder coding data into 2-bit ($X_1$, $X_2$) normal/robust data symbols so that the trellis encoder of FIG. 4 could output 4-level signals of {−5, −3, 1, 7} or {−7, −1, 3, 5} selectively with respect to robust data in accordance with the embodiment of the present invention.

FIGS. 9 through 11 are detailed block diagrams showing the reinforcement encoder 411 of FIG. 4 in accordance with an embodiment of the present invention. FIG. 9 presents the reinforcement encoder 411 encoding robust data into 2-bit $(X_1, X_2)$ normal/robust data so as to output 4-level signals of {−5, −3, 1, 7}. FIG. 10 shows the reinforcement encoder encoding robust data into 2-bit $(X_1, X_2)$ normal/robust data so as to output 4-level signals of {−7, −1, 3, 5}. FIG. 11 shows the reinforcement encoder encoding robust data into 2-bit $(X_1, X_2)$ normal/robust data so as to output 4-level signals of {−5, −3, 1, 7} or {−7, −1, 3, 5} selectively.

Some multiplexers included in the reinforcement encoder 411 receive normal data and robust data and output normal data and robust data according to the robust data flag.

In another embodiment illustrated in FIGS. 12 to 15 as well as the embodiment of FIGS. 9 to 11, the outputted values of the trellis encoding block with respect to the inputted values of the normal data $X_1'$(LSB) and $X_2'$(MSB) are $Z_0=D_3$, $Z_1=X_1, Z_2=(X_2'\text{XOR } D_1)$. The symbol mapping blocks outputs 8-level signals {−7, −5, −3, −1, 1, 3, 5, 7} according to the trellis-encoded symbols $Z_0, Z_1,$ and $Z_2$.

Referring to FIG. 9, the reinforcement encoder 411 can be largely divided into a first block 901, a second block 903, and a third block 905. The first block 901 is used for normal/robust data. It estimates an output bit $Z_0$ of a trellis encoding block by using a prior output bit $X_1$ of the reinforcement encoder 411 which is released right before. It includes registers $D_2$ and $D_3$ of the trellis encoding block. Therefore, if the registers $D_2$ and $D_3$ of the trellis encoding block are used directly, the first block 901 can be omitted. An embodiment on this is presented in FIGS. 12 to 15.

The second block 903 is used for robust data. It determines whether to make the value of $Z_1$ the same as the value of $Z_2$ or the inverse value of the $Z_2$ by using the estimated value $D_3$ of $Z_0$ of the first block 901 or the register value $D_3$ of the trellis encoding block.

If the estimated value $D_3$ of $Z_0$ of the first block 901 or the register value $D_3$ of the trellis encoding block is 0, the second block 903 of FIG. 9 makes the value of $Z_1$ the same as the inverse value of $Z_2$. If the estimated value $D_3$ of $Z_0$ of the first block 901 or the register value $D_3$ of the trellis encoding block is 1, the second block 903 makes the value of $Z_1$ the same as the value of $Z_2$. In short, $X_1$=inverted $X_1'$ ($D_3$=0) or $X_1=X_1'$ ($D_3$=1). Ultimately, the output signal level of the trellis encoder 415 is mapped to {−5, −3, 1, 7} in this embodiment.

Referring to FIG. 10, if the estimated value $D_3$ of $Z_0$ of the first block 901 or the register value $D_3$ of the trellis encoding block is 1, a second block 1003 of FIG. 10 makes the value of $Z_1$ the same as the inverse value of $Z_2$. If the estimated value $D_3$ of $Z_0$ of the first block 901 or the register value $D_3$ of the trellis encoding block is 0, the second block 1003 of FIG. 10 makes the value of $Z_1$ the same as the value of $Z_2$. In short, $X_1$=inverted $X_1'$ ($D_3$=1) or $X_1=X_1'$ ($D_3$=0). Ultimately, the output signal level of the trellis encoder 415 is mapped to {−7, −1, 3, 5} in this embodiment.

FIG. 11 presents an embodiment where the output signal level of the trellis encoder 415 is mapped to {−5, −3, 1, 7} or {−7, −1, 3, 5} selectively by making an estimated value $D_3$ of $Z_0$ of the first block 901 or a register value $D_3$ of the trellis encoding block be 0 or 1 selectively according to a level selecting signal.

The level selecting signal selects mapping. For example, if the output signal level of the trellis encoder 415 with respect to current robust data is mapped to {−5, −3, 1, 7}, the level selecting signal selects to map the output signal level of the trellis encoder 415 with respect to current robust data to {−7, −1, 3, 5} with respect to the next robust data. The selection may be made in a predetermined period.

Figure 16:
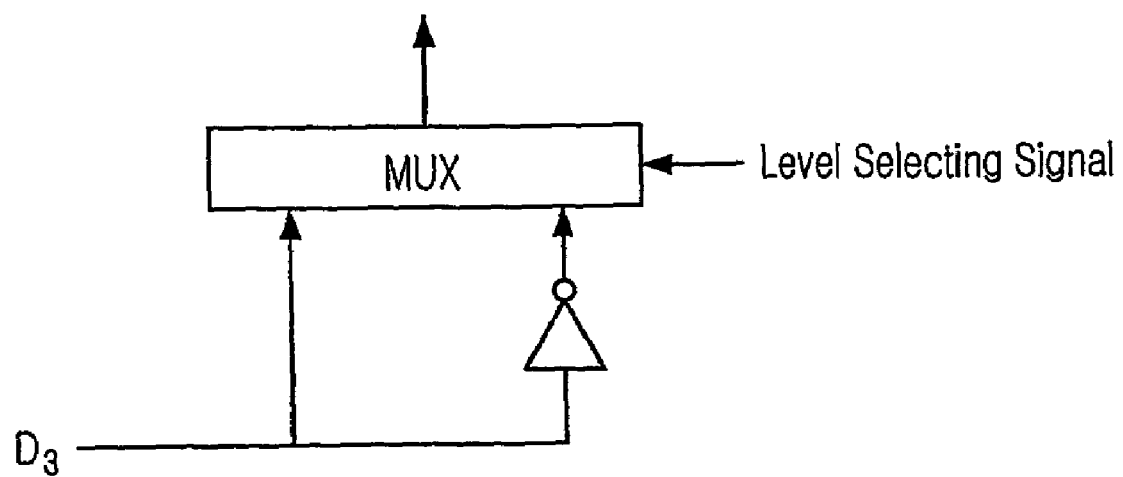
FIG. 16 is a diagram showing a $Z_0$ estimated value ($D_3$) and a level selecting signal in accordance with an example of the present invention.

FIG. 16 shows an embodiment of a $Z_0$ estimated value $D_3$ and a level selecting signal. The third block 905 of FIG. 9 is used for normal/robust data. It offsets a pre-coding block with respect robust data of the trellis encoder 415. For example, the third block 905 offsets the pre-coding block with respect to an inputted value of the robust data $X_1'$(LSB) to thereby make the outputted value of a trellis encoding block be $Z_2=X_1$.

The third block includes a register $D_1$ included in the pre-coding block of the trellis encoder 415. Therefore, if the register $D_1$ included in the pre-coding block is used directly, the register $D_1$ can be omitted. This is shown in the embodiment of FIGS. 12 to 15. The MUX of the third block 905 receives $X_2'$(MSB) of normal data and $X_1'$(LSB) of robust data. As described above, since the $X_1'$(LSB) of robust data includes information data and the $X_2'$(MSB) includes an arbitrary value, the $X_2'$(MSB) of robust data is not used.

For example, if a flow of time is divided into time 0, time 1, and time 2, the relationship between the outputted values $X_1$ and $X_2$ of the reinforcement encoder 411, the outputted values $Z_2$, $Z_1$ and $Z_0$ of the trellis encoder 415, and the register values $D_1$, $D_2$ and $D_3$ is expressed as Equations 4 and 5:

$$Z_2|_{time1}=D_1|_{time0}\, XOR\, X_2|_{time1}=D_1|_{time1}$$

$$Z_1|_{time1}=X_1|_{time1}$$

$$Z_0|_{time1}=D_3|_{time0}=D_2|_{time1}$$

$$D_3|_{time1}=D_2|_{time0}\, XOR\, X_1|_{time1} \quad \text{Equation 4}$$

$$Z_0|_{time2}=D_3|_{time1} \quad \text{Equation 5}$$

That is, the current output bit $Z_0$ is the prior register value $D_3$ and it is estimated from the prior bit $X_1$.

In accordance with the embodiment of FIGS. 9 to 13, the $X_1'$(LSB) of robust data, $Z_0$ estimated values ($Z_0^*$=prior $D_3$), $X_1$, $Z_2$, $Z_1$, $Z_0$, and symbol levels are as shown in Table 3 below.

TABLE 3

| $X_1'$ | $Z_0^*$ | $X_1$ | $Z_2$ | $Z_1$ | $Z_0$ | Symbol level |
|---|---|---|---|---|---|---|
| 0 | 0 | 1 | 0 | 1 | 0 | −3 |
| 1 | 0 | 0 | 1 | 0 | 0 | 1 |
| 0 | 0 | 1 | 0 | 1 | 0 | −3 |
| 1 | 0 | 0 | 1 | 0 | 0 | 1 |
| 0 | 1 | 0 | 0 | 0 | 1 | −5 |
| 1 | 1 | 1 | 1 | 1 | 1 | 7 |
| 0 | 1 | 0 | 0 | 0 | 1 | −5 |
| 1 | 1 | 1 | 1 | 1 | 1 | 7 |

In accordance with the embodiment of FIGS. 10 to 14, The $X_1'$(LSB) of robust data, $Z_0$ estimated values ($Z_0^*$=prior $D_3$), $X_1$, $Z_2$, $Z_1$, $Z_0$, and symbol levels are as shown in Table 4 below.

TABLE 4

| $X_1'$ | $Z_0^*$ | $X_1$ | $Z_2$ | $Z_1$ | $Z_0$ | Symbol Level |
|---|---|---|---|---|---|---|
| 0 | 0 | 0 | 0 | 0 | 0 | −7 |
| 1 | 0 | 1 | 1 | 1 | 0 | 5 |
| 0 | 0 | 0 | 0 | 0 | 0 | −7 |
| 1 | 0 | 1 | 1 | 1 | 0 | 5 |
| 0 | 1 | 1 | 0 | 1 | 1 | −1 |
| 1 | 1 | 0 | 1 | 0 | 1 | 3 |
| 0 | 1 | 1 | 0 | 1 | 1 | −1 |
| 1 | 1 | 0 | 1 | 0 | 1 | 3 |

Referring back to FIG. 4, the robust data processor 413 protects robust data from being restored erroneously in receivers adopting 8-VSB technology, i.e., 8-VSB receiver. It provides backward compatibility for the 8-VSB receivers. Therefore, if a receiver adopting 4-VSB technology, i.e., a 4-VSB receiver, is used just as in the embodiments of the present invention, the robust data processor 413 that provides the backward compatibility is unnecessary.

The amplitude of signals processed in a transmitter that does not provide backward compatibility, or signal processing, can be different from the amplitude of signals processed in a transmitter that provides backward compatibility. For example, the packet formatter 503 of the transmitter not supporting the backward compatibility receives 207 bytes data from the robust data interleaver 501, processes the data. Robust data outputted from the reinforcement encoder 411 in the transmitter not providing the backward compatibility do not pass through the robust data processor 413. They go through only the trellis deinterleaving and are inputted to the trellis encoder 415.

However, as to be described below, it is obvious to those skilled in the art that the present invention is applicable, regardless of whether the transmitter provides backward compatibility or not. Therefore, it should be understood that the transmitter of the present invention is not limited to the embodiment where the backward compatibility is provided.

Figure 17:
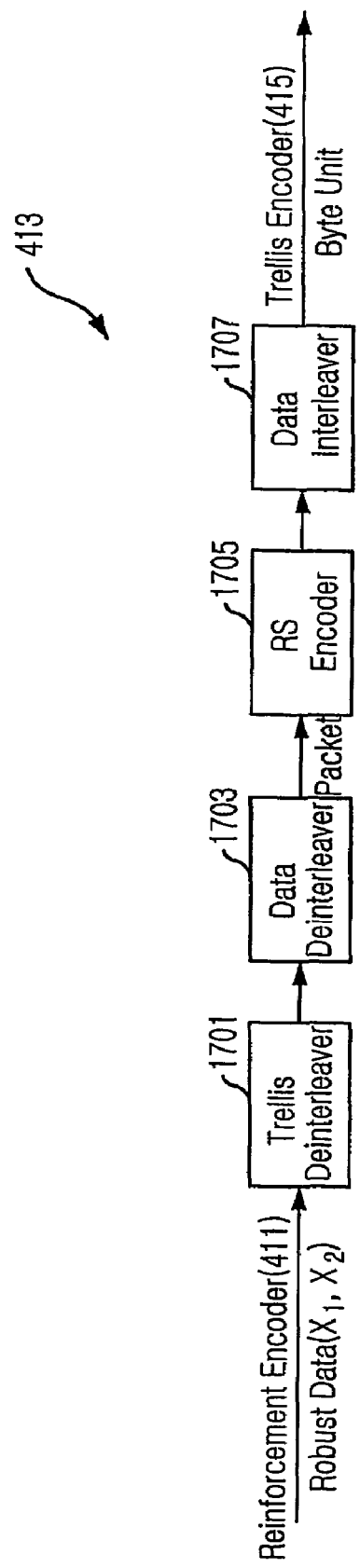
FIG. 17 is a block diagram describing details of the robust data processor in FIG. 4.

FIG. 17 is a block diagram describing details of the robust data processor in FIG. 4. Referring to FIG. 17, the robust data processor 413 includes a trellis deinterleaver 1701, a data deinterleaver 1703, an RS encoder 1705 and a data interleaver 1707. Robust data $X_1$ and $X_2$ and a robust data flag outputted from the robust encoder 411 are recombined as a packet by being trellis-deinterleaved and data deinterleaved at the trellis deinterleaver 701 and data deinterleaver 1703.

As mentioned above, 207 bytes of data block generated at the packet formatter 503 includes 20 bytes of arbitrary information. The RS encoder 1705 changes 20 bytes of the arbitrary information to RS parity information. The robust data having the RS parity information are data-deinterleaved at the data deinterleaver 1707 and outputted to the trellis encoder 415 as a byte unit.

Referring to FIG. 4, the second multiplexer 417 generates a data frame for transmitting by combining 8-level symbol of normal data and 4-level symbol of the robust data with segment synchronization and field synchronization bit sequences. After combining, a pilot signal is inserted by a pilot adder. A symbol stream is modulated as a suppressed carrier. Finally, 8-VSB/4-VSB symbol stream of base band is modulated to radio frequency signal at RF converter and the radio frequency signal is transmitted.

Figure 18:
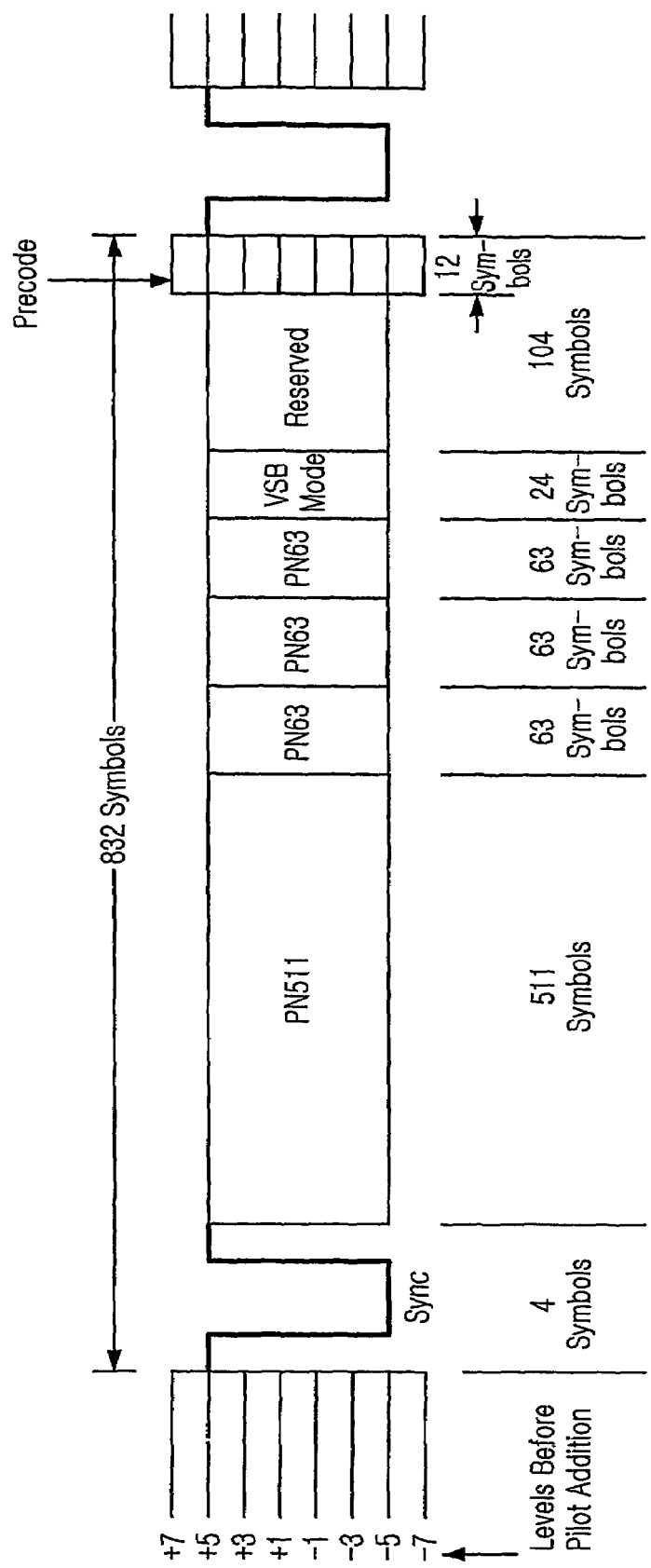
FIG. 18 is a diagram illustrating field synchronous segments transmitted by the transmitter 400 of FIG. 4 in accordance with the present invention.

FIG. 18 is a diagram illustrating field synchronous segments transmitted by the transmitter 400 of FIG. 4 in accordance with the present invention. Referring to FIG. 18, basically, a segment of the transmitter 400 is identical to a segment of ATSC A/53 standard. However, the segment of the transmitter includes information for restoration of robust data packet at 92 symbols among 104 symbols in a reserved region. The information for restoration of robust data packet includes information about a rate of the robust data and normal data in a field (NRP) and information about a coding rate of the robust data (½ or ¼). To be described later, a receiver of the present invention generates a robust data flag based on the information for restoration of robust data packet and determines whether or not currently processed data is the robust data packet based on the robust data flag.

Figure 19:
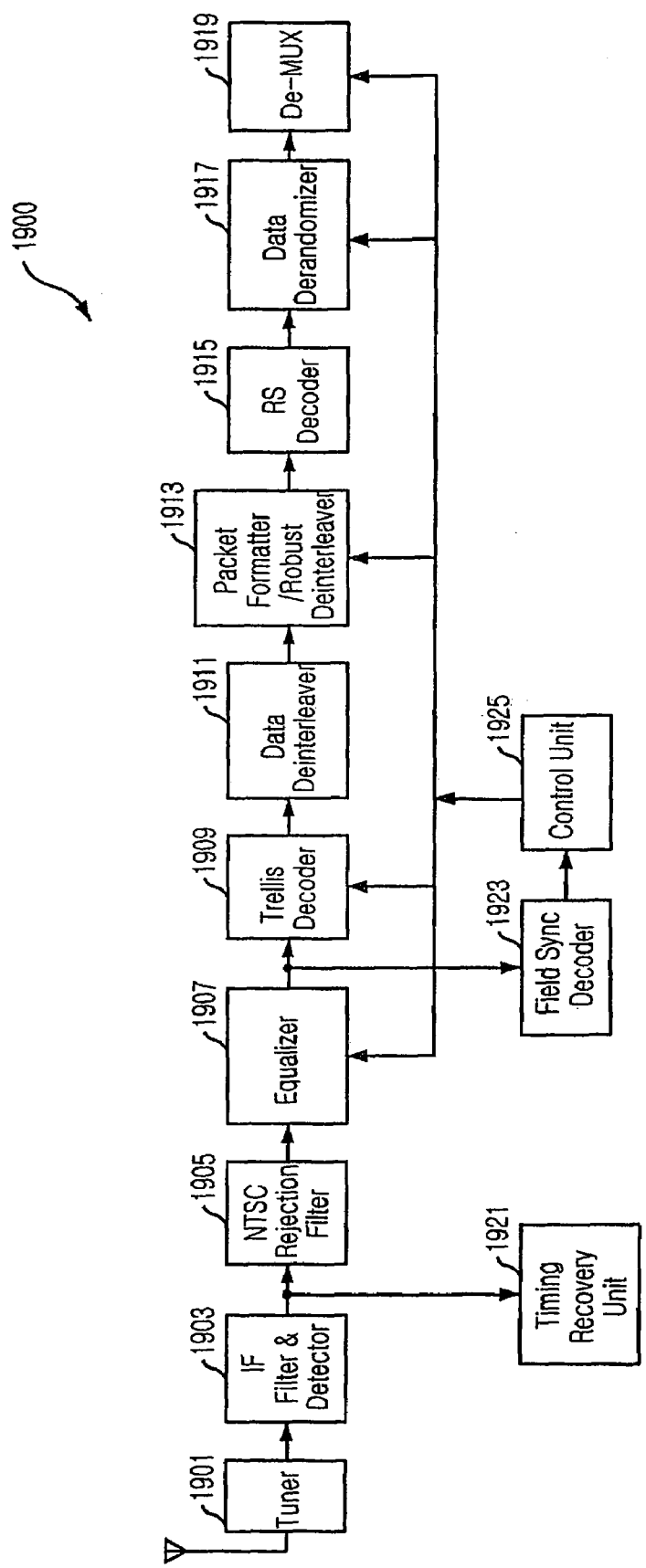
FIG. 19 is a block diagram showing a DTV receiver in accordance with an embodiment of the present.

FIG. 19 is a block diagram showing a DTV receiver in accordance with an embodiment of the present invention. Referring to FIG. 19, a receiver 1900 includes a tuner 1901, IF filter and detector 1903, a NTSC rejection filter 1905, an equalizer 1907, a trellis decoder 1909, a data deinterleaver 1911, a packet formatter/robust deinterleaver 1913, a RS decoder 1915, a data derandomizer 1917, a demultiplexer 1919, a synchronization and timing recovery unit 1921, a field synchronization decoder 1923 and a controlling unit 1925.

A decoding technique of the present invention decodes normal data transmitted by mapping to a group expressed as 8-levels {−7, −5, −3, −1, 1, 3, 5, 7} and decodes robust data transmitted by mapping one of groups expressed as 4-levels {−5, −3, 1, 7} or {−7, −1, 3, 5}. The decoding technique of the present invention can be implemented to other decoding technique which decodes the robust data by mapping one of the groups expressed as 4-levels {−7, −5, 5, 7} or {−7, −3, 3, 7}.

In this case, the embodiment of the present invention includes a selection unit for selecting one of a signal path decoding the robust data transmitted by being mapped as a mapping group of present invention e.g., {−5, −3, 1, 7} or {−7, −1, 3, 5} and other signal path decoding the robust data transmitted by being mapped as another mapping group, e.g., {−7, −5, 5, 7} or {−7, −3, 3, 7}. The robust data can be decoded according to selected signal path in the present invention.

The decoding signal paths may be functionally separated signal paths. For example, the equalizer 1907 performs an equalization of received signal based on a robust data flag, which will be described later. The robust data flag may include information for determining whether data to be processed are one of normal data, the robust data transmitted by being mapped as a mapping group of present invention, e.g., {−5, −3, 1, 7} or {−7, −1, 3, 5} and the robust data transmitted by being mapped as another mapping group, e.g., {−7, −5, 5, 7} or {−7, −3, 3, 7}. For the normal data signal, the information is used for determining signal level among 8-levels {−7, −5, −3, −1, 1, 3, 5, 7}.

In case of the robust data, the information is used for determining a signal level among 4-levels of one of mapping groups of present invention {−5, −3, 1, 7} or {−7, −1, 3, 5}, or another mapping groups {−7, −5, 5, 7} or {−7, −3, 3, 7}. Similarly, the trellis decoder 1909 performs a trellis decoding of 8-levels {−7, −5, −3, −1, 1, 3, 5, 7} for the normal data. Also, the trellis decoder 1909 performs a trellis decoding of 4-level of one of mapping groups of present invention {−5, −3, 1, 7} or {−7, −1, 3, 5} and another mapping group {−7, −5, 5, 7} or {−7, −3, 3, 7} in case of the robust signal.

Figure 2:
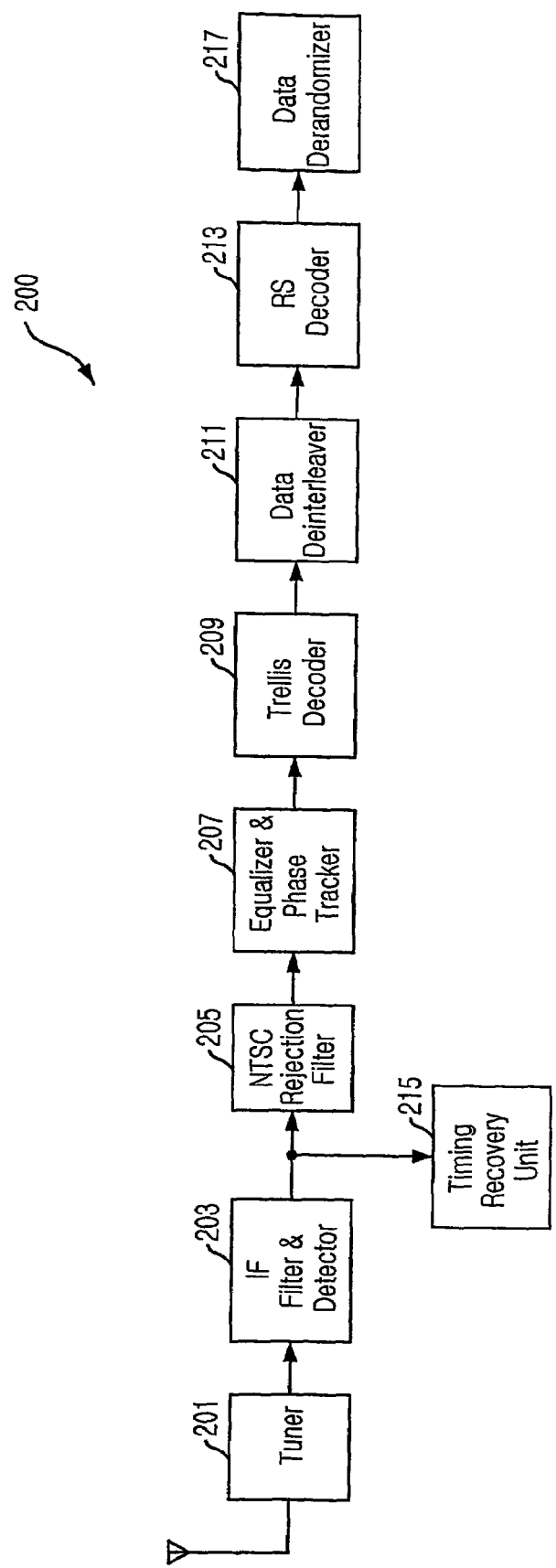
FIG. 2 is a block diagram showing a typical DTV receiver.
Figure 3:
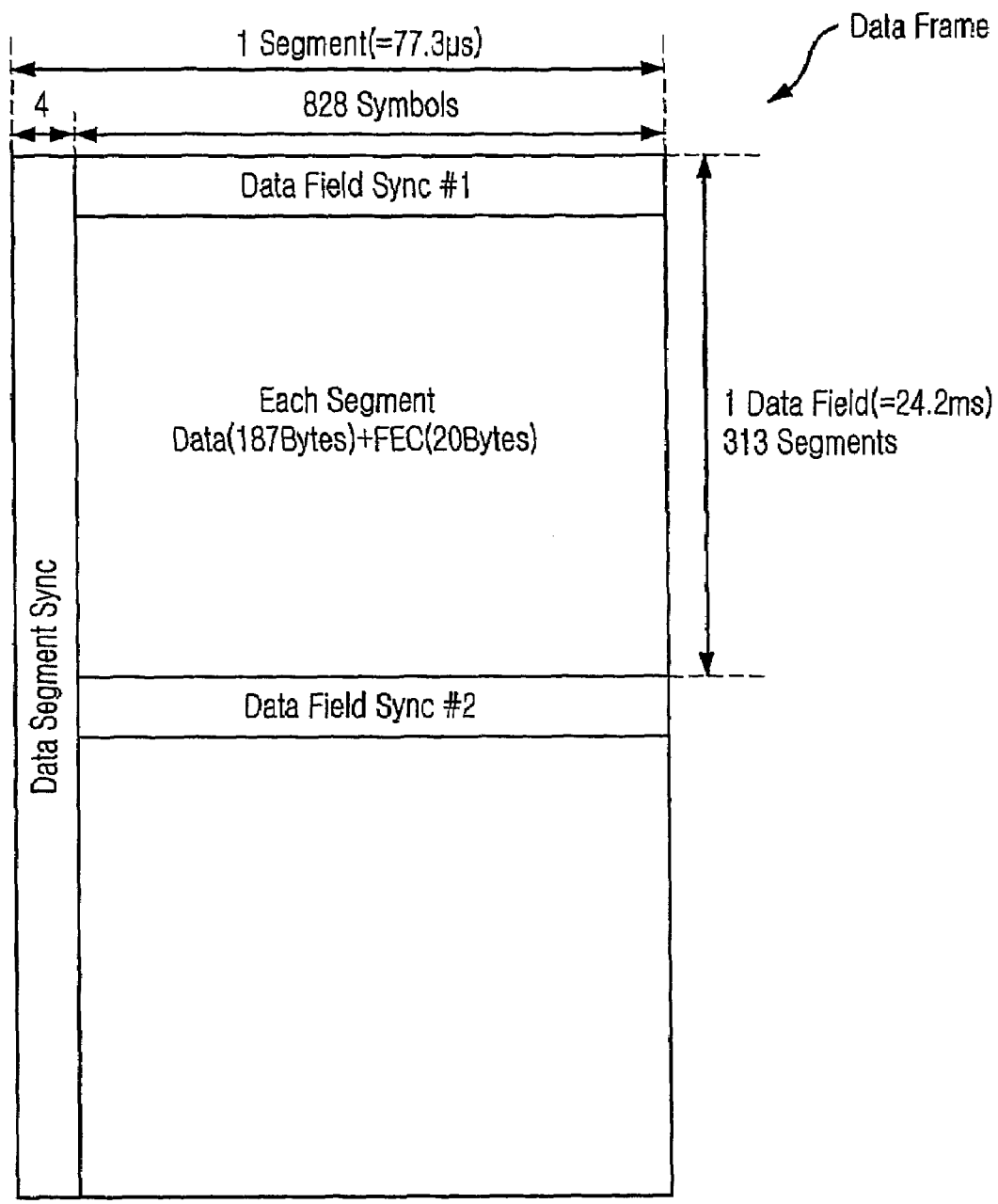
FIG. 3 is a diagram depicting a transmitting data frame exchanged between the transmitter of FIG. 1 and the receiver of FIG. 2.

The tuner 1901, the IF filter and detector 1903, the NTSC rejection filter 1905, the data deinterleaver 1911, the RS decoder 1915 and synchronization and timing recovery unit 1921 in FIG. 9 perform identical functions of The tuner 201, the IF filter and detector 203, the NTSC rejection filter 205, the data deinterleaver 211, the RS decoder 213 and synchronization and timing recovery unit 215 in FIG. 2, respectively.

4-levels robust data {−5, −3, 1, 7} or {−7, −1, 3, 5} used in the receiver 1900 depend on 4-level robust data used in the transmitter 400. The field synchronization decoder 1923 receives the segment of data frame shown in FIG. 18 and restores robust data packet restoration information including information about a rate of normal data and robust data in a field and a coding rate of the robust data in the reserved region.

Figure 20:
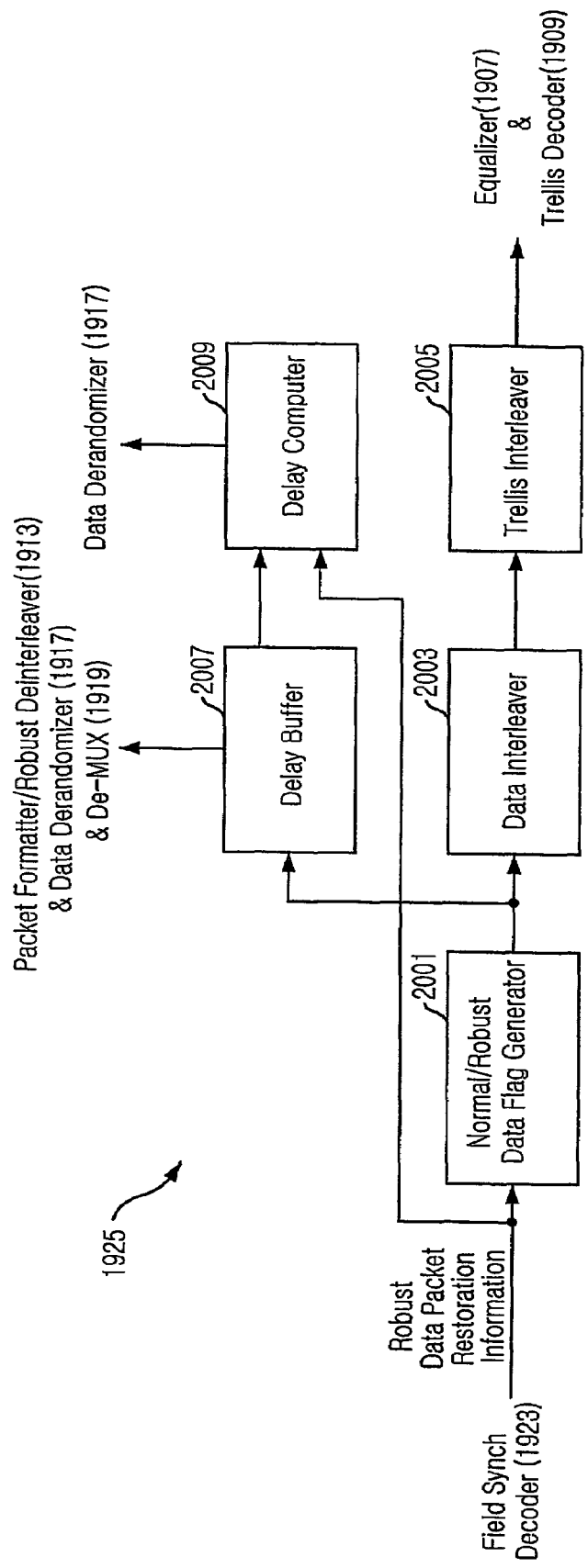
FIG. 20 is a block diagram illustrating details of a control unit in FIG. 19.

FIG. 20 is a block diagram illustrating details of a control unit in FIG. 19. Referring to FIG. 20, the control unit 1925 includes a normal/robust data flag generator 2001, a data interleaver 2003, a trellis interleaver 2005, a delay buffer 2007 and a delay computer 2009. The normal/robust data flag generator 2001 generates a robust data flag by using robust data packet restoration information received from the field synchronization decoder 1923.

The robust data packet restoration information is data-interleaved in bit unit at the data interleaver 2003 and is trellis-interleaved according to ATSC A/53 at the trellis interleaver 2005. After interleaved, the robust data packet restoration information is transmitted to the equalizer 1907 and the trellis decoder 1909.

The equalizer 1907 and the trellis decoder 1909 perform equalization and trellis decoding based on the data-interleaved and trellis-interleaved robust data flag because the robust data flag included in the data frame transmitted from the transmitter 400 are already data-interleaved and trellis-interleaved.

In a meantime, the delay buffer 2007 receives the robust data flag generated from the normal/robust data flag generator 2001 and delays the robust data flag based on delay generated according to process data in the trellis decoder 1909 and the data deinterleaver 1911. The delayed robust data flag is transmitted to the packet formatter/robust deinterleaver 1913. Also, the delay buffer 2007 delays the robust data flag based on a delay generated according to process data in the packet formatter/robust deinterleaver 1913 and the delayed robust data flag is transmitted to the data derandomizer 1917, the de-MUX 1919 and the delay computer 2009.

The delay computer 2009 computes a delay amount of the robust data packet based on the robust data packet restoration information received from the robust data flag and field synchronization decoder 1923 and the delay robust data flag from the delay buffer 2007. The computed delay amount is transmitted to the data derandomizer 1917. The data derandomizer 1917 performs derandomization by being synchronized at a field synchronization signal of data frame.

The robust data packet restoration information received from the field synchronization decoder 1923 includes information about location of robust data packet in the data frame. However, the packet formatter/robust deinterleaver 1913 only process data of robust data packet and specially, deinterleaving process performing robust deinterleaver generates delay as much as few packets. The delay computer 2009 computes delay amount of robust data packet based on the received robust data packet restoration information and robust data flag for compensating the delay for the robust data packet and computed delay amount is transmitted to the data derandomizer 1917.

The data randomizer 1917 performs the derandomization of normal data packet and robust data packet based on the computed delay amount. For example, after derandomizing the $n^{th}$ normal data packet, the derandomizer should derandomizer the $(n+1)^{th}$ normal data packet. However, the derandomizer may derandomize the $k^{th}$ robust data packet, wherein k is smaller than n.

As mentioned above, a delay for normal data packet is longer than a delay of robust data packet. It is because the delay of normal data packet includes delay generated at the packet formatter/robust deinterleaver 1913 for restoration of packet. Accordingly, the data derandomizer 1917 performs the derandomization based on the above mentioned delay.

Figure 21:
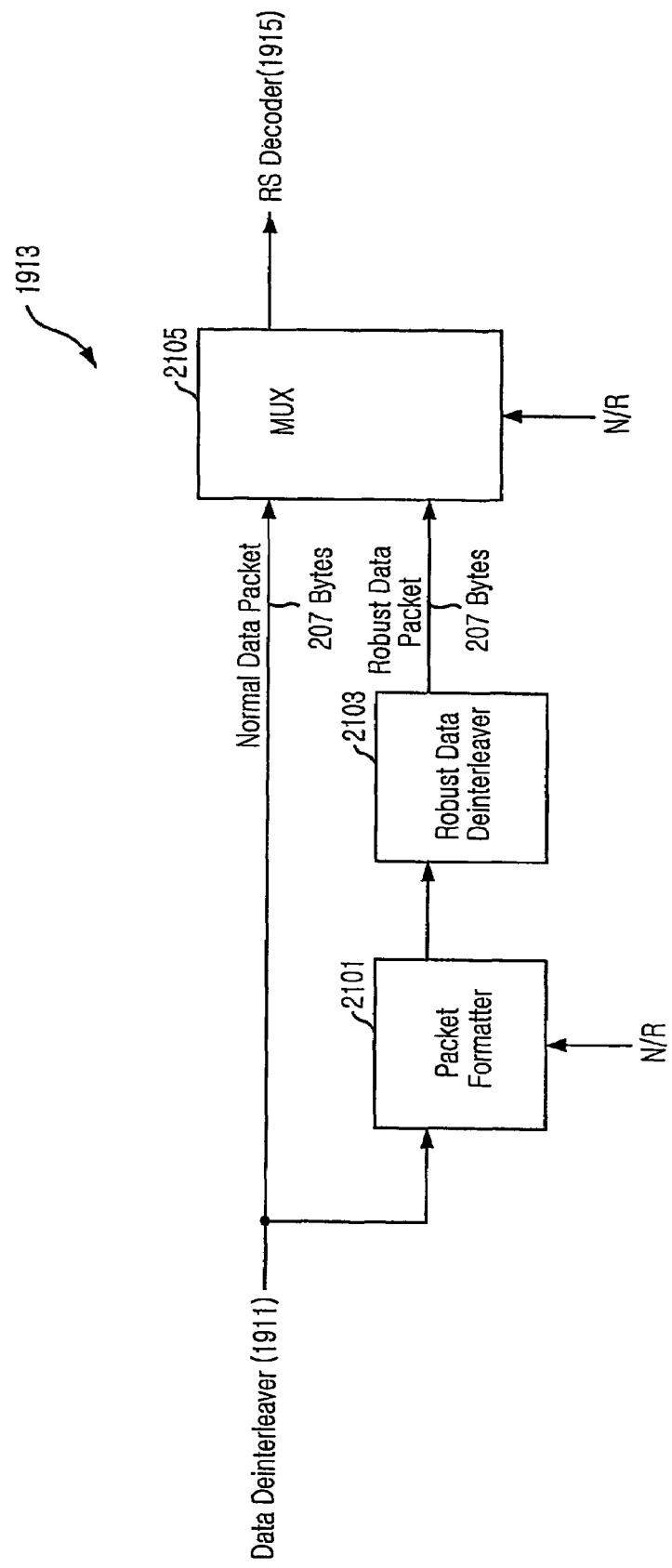
FIG. 21 is a block diagram describing a packet formatter/robust deinterleaver in FIG. 19.
Figure 22:
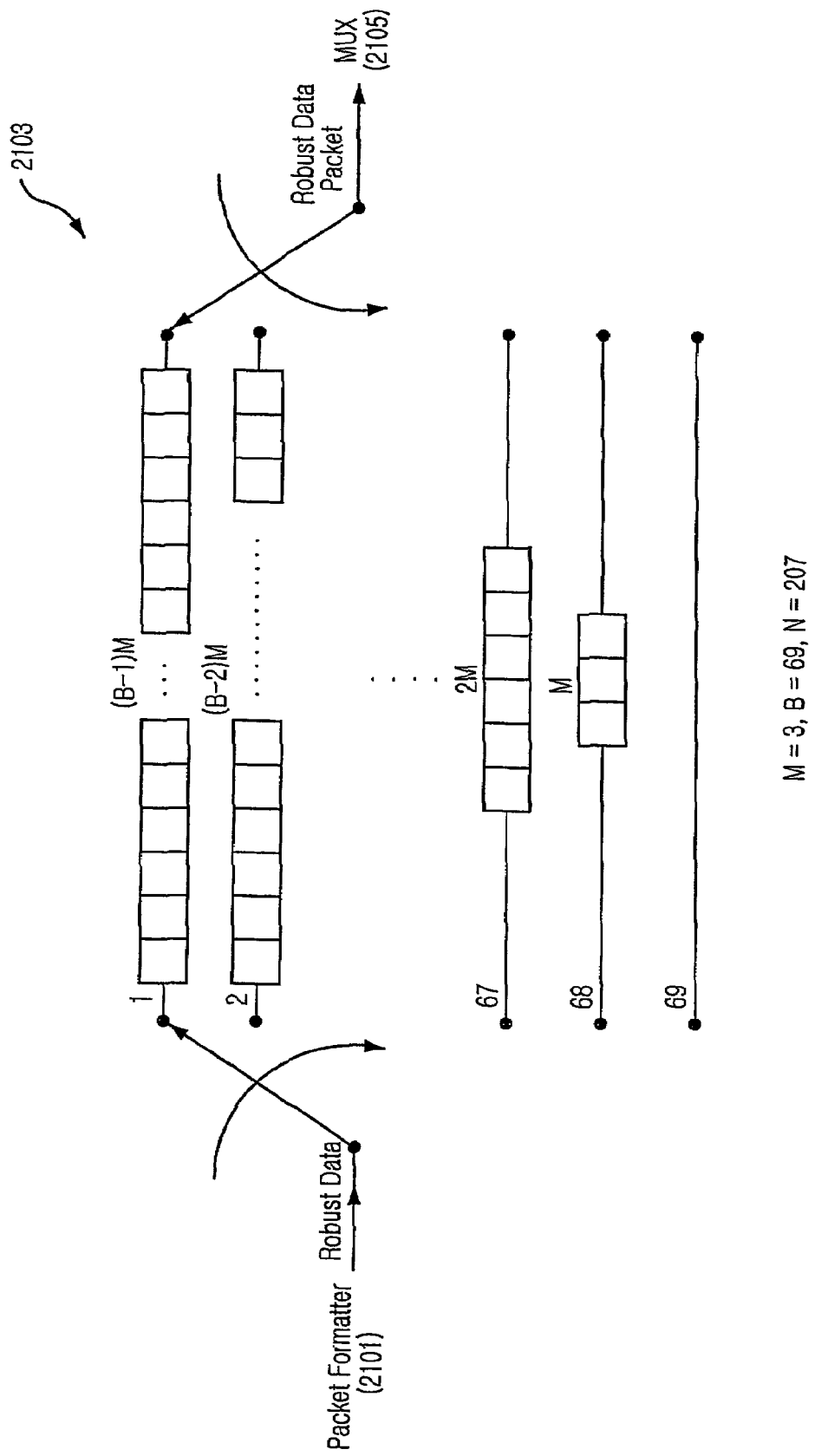
FIG. 22 is a robust data deinterleaver in FIG. 21.

FIG. 21 is a block diagram describing a packet formatter/robust deinterleaver in FIG. 19. FIG. 22 is a conceptual view of robust data deinterleaving operation in FIG. 21. The packet formatter/robust deinterleaver performs reversed operation of the robust interleaver/packet formatter 407 of the transmitter 400. That is, the formatter/robust deinterleaver generates robust data packet and null packet including information data by eliminating RS parity bytes (20 bytes) and header bytes (3 bytes) included in a robust data segment (207 bytes) which is inputted from the data deinterleaver 1911.

Therefore, if 9 packets of robust data segment is inputted to the packet formatter 2011, the packet formatter 2011 outputs 4 robust data packets having information data and 5 null data having null information. The robust data deinterleaver 2103 receives the robust data packet in byte unit from the packet formatter 2011 and performs a deinterleaving operation.

After deinterleaving operation, the robust data deinterleaver 2103 outputs the robust data packet to the multiplexer 2105. During the deinterleaving operation, the null packets included in the robust data packet are eliminated and the deinterleaving operation is performed on only information packet. The normal data packet is delayed in predetermined amount of time for multiplexing with the robust data packet.

The multiplexed normal data packet and the robust data packet are transmitted to the RS decoder 1915. The RS decoder 1915 RS-decodes each packet and outputs the RS-decoded packet to the data derandomizer 1917.

Referring to FIG. 19 again, the de-MUX 1919 demultiplexes the normal data packet and the robust data packet according to the robust data flag and outputs demultiplexed normal data packet and robust data as a form of a series of data stream which is constructed with 188 bytes of MPEG-compatible data packet.

A widely known determiner or trellis decoder which has a trace back as 0 can be used as the equalizer 1907. The equalizer 1907 performs an equalization operation on a received signal based on the robust data flag which is bit-unit data interleaved and trellis-interleaved according to ATSC A/53. In a case of the normal data signal, a signal level is determined among 8-levels $\{-7, -5, -3, -1, 1, 3, 5, 7\}$.

In a case of the robust data signal, the equalizer 1907 determines a signal level among 4-levels $\{-5, -3, 1, 7\}$ or $\{-7, -1, 3, 5\}$. For example, 4-level signal of $\{-5, -3, 1, 7\}$ or $\{-7, -1, 3, 5\}$ are used as a decision data which is used for updating tap coefficient of the equalizer 1907 in case of the robust data signal. For example, a trellis decoder used in the equalizer 1907 determines a signal level of the robust data signal according to a state map based on 4-level instead of using a stat map based on 8-level.

That is, it is possible to precision determination of signal level because a signal level is determined by limiting part of paths for the robust data. Because precision determination of signal level increases converging speed of the equalizer, a receiving performance for both robust data and normal data can be improved in a Doppler environment.

The trellis decoder 1909 can be implemented by using a trellis decoder based on ATSC A/53 standard. The trellis decoder 1909 performs a trellis-decoding operation on 8-level of $\{-7, -5, -3, -1, 1, 3, 5, 7\}$ for normal data signal and performs a trellis-decoding operation on 4-level of $\{-5, -3, 1, 7\}$ or $\{-7, -1, 3, 5\}$ for the robust data signal, which is similar to the trellis decoder used in the equalizer 1907. That is, the trellis decoder 1909 performs the trellis-decoding operation on the robust data signal according to a state map based on 4-level instead of using a state map based on 8-level.

Figure 23:
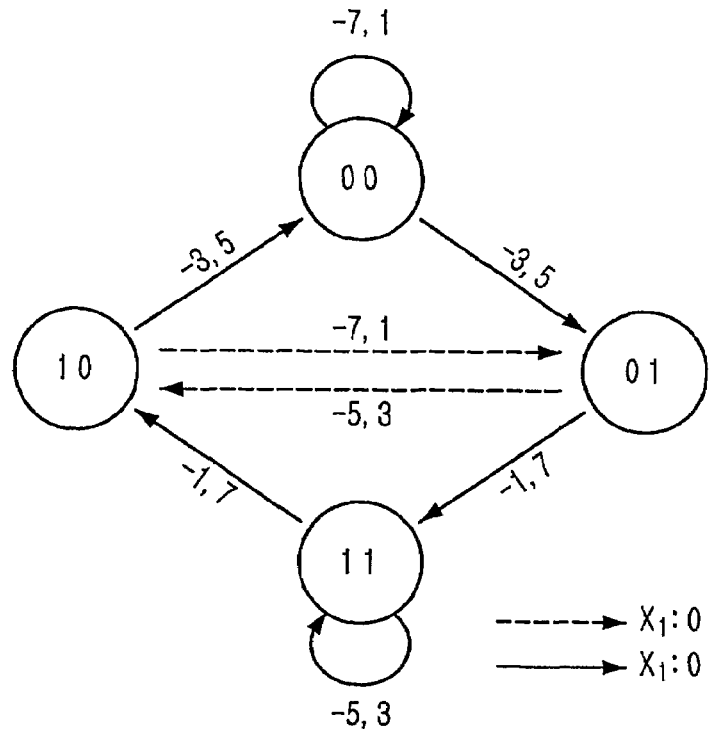
FIG. 23 is a state diagram showing a typical 8-level.
Figure 24:
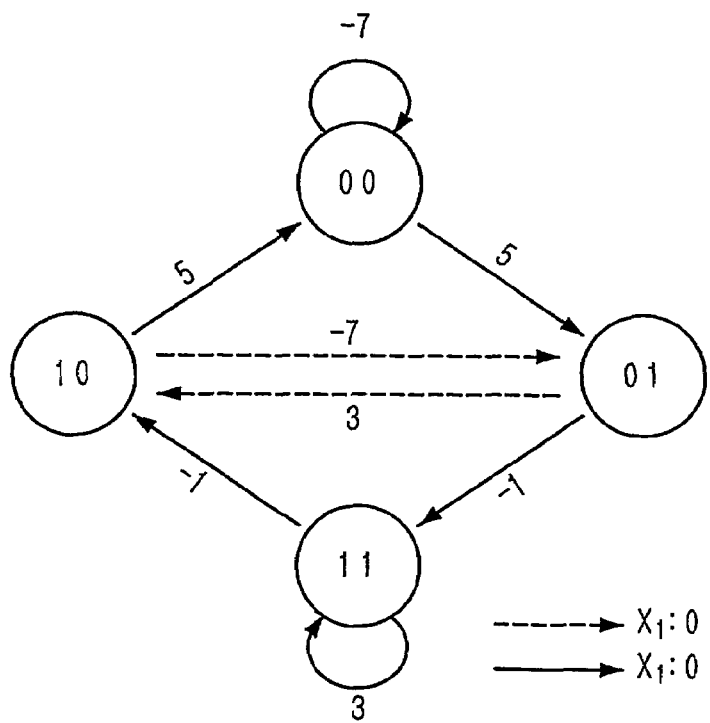
FIG. 24 is a state diagram depicting a 4-level of {−7, −1, 3, 5} in accordance with an embodiment of the present invention.

It is possible to precision trellis decoding because the trellis-decoding operation on the robust data is performed by limiting part of path. FIG. 23 is a diagram showing a state map based on 8-levels and FIG. 24 is a diagram depicting a state map based on 4-levels of $\{-7, -1, 3, 5\}$. Referring to FIGS. 23 and 24, in the conventional state map based on 8-levels, cases for becoming a current state as "00" during generating symbol are 4 cases such as a case that a previous state is "00" and signal levels are $\{-7\}$ and $\{1\}$ and a case that a previous state is "10" and signal levels are $\{-3\}$ and $\{5\}$.

In the state map based on 4-levels in accordance with a present invention, case for becoming a current state as "00" are 2 cases such as a case that a previous state is "00" and signal level is $\{-7\}$ and a case that a previous state is "10" and signal level is $\{5\}$. As mentioned above, the trellis decoding operation is performed on the robust data by limiting part of paths and therefore, it increases a pre-distance which influences to a performance of the trellis decoding.

According to a preferred embodiment of the present invention, the 8-VSB receiver based on ATSC A/53 Standards can receive the normal data packet and, also, provide a backward-compatibility by processing the robust data packet as the null packet.

Figure 25:
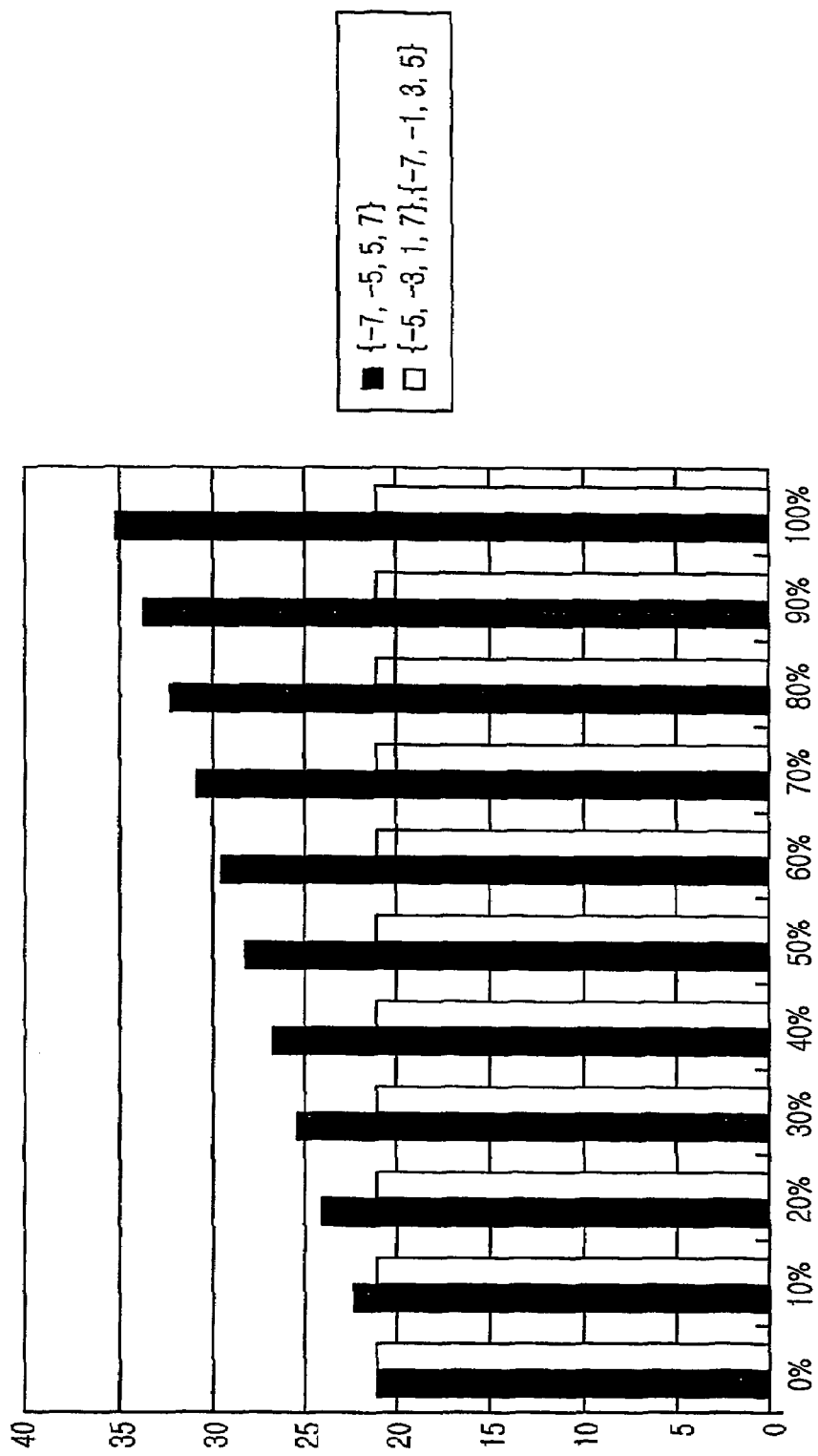
FIG. 25 is a graph showing signal-to-noise ratio (SNR) that satisfies the threshold of visibility (TOV) of an 8-Vestigial Side Band (VSB) receiver in agreement with Advanced Television System Committee (ATSC) A/53 standards in an Additive White Gaussian Noise (AWGN) channel environment.

FIG. 25 is a graph showing comparison of average symbol power (energy/symbol) between a conventional 4-VSB communication system and 4-VSB communication system of the present invention. That is, the conventional $\{-7, -5, 5, 7\}$ 4-VSB technology depicted in block and the technology of the present invention depicted in white. The Y axis of the graph shows a rate of the robust data in normal data packet and the x axis represents average symbol power (energy/symbol).

According to conventional $\{-7, -5, 5, 7\}$ 4-VSB technology, average symbol power is increased corresponding to the increasing rate of robust data in normal data packet. However, in according to the present invention, the average symbol power is not influenced to the rate of robust data in normal data packet.

Furthermore, the average symbol power of the present invention is 21 and therefore, the average symbol power for transmitting symbol of the robust data is identical to average symbol power of a conventional 8-VSB mode.

As mentioned above, the present invention can transmit dual stream constructed with the robust data based on specific 4-VSB mode and normal data based on 8-VSB mode without increasing average power and without considering a rate of combination of the normal data and robust data. Furthermore, the present invention satisfies TOV and decreases SNR by improving receiving performance of both robust data and normal data.

While the present invention has been described with respect to certain preferred embodiments, it will be apparent to those skilled in the art that various changes and modifications may be made without departing from the scope of the invention as defined in the following claims.

What is claimed is:

1. A system for transmitting a digital signal, comprising:
    an input means for receiving digital video data stream;
    an encoding means for encoding robust data included in the digital video data stream such that the robust data are mapped to one of two groups $\{-5, -3, 1, 7\}$ and $\{-7, -1, 3, 5\}$ each group having four levels, to thereby generate an encoded signal; and
    a vestigial side band (VSB) transmitting means for performing VSB modulation of the encoded signal to generate a VSB modulated signal and transmitting the VSB modulated signal.

2. The system as recited in claim 1, wherein the digital video data stream includes normal data.

3. The system as recited in claim 2, wherein the encoding means encodes the normal data such that the normal data are mapped into $\{-7, -5, -3, -1, 1, 3, 5, 7\}$.

4. The system as recited in claim 1, wherein the encoding means includes:
    a robust encoder for encoding two bits of information data $(X_1', X_2')$ of the digital video signal to generate two bits of data symbol represented by $(X_1, X_2)$; and
    a trellis encoder for encoding the two bits of data symbol represented by $(X_1, X_2)$ to generate three bits of data symbols each having one of three levels represented by $(Z_2, Z_1, Z_0)$.

5. The system as recited in claim 4, wherein the robust encoder encodes the information data $(X_1')$ based on a prediction value of $Z_0$ such that the trellis encoder generates a data symbol having one of four levels $\{-5, -3, 1, 7\}$ expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 1 | 0 | 1 | 0 | -3 |
| 1 | 0 | 0 | 1 | 0 | 0 | 1 |
| 0 | 0 | 1 | 0 | 1 | 0 | -3 |
| 1 | 0 | 0 | 1 | 0 | 0 | 1 |
| 0 | 1 | 0 | 0 | 0 | 1 | -5 |
| 1 | 1 | 1 | 1 | 1 | 1 | 7 |
| 0 | 1 | 0 | 0 | 0 | 1 | -5 |
| 1 | 1 | 1 | 1 | 1 | 1 | 7 | wherein $Z_0^*$ is a prediction value of $Z_0$.

6. The system as recited in claim 4, wherein the robust encoder encodes the information data($X_1'$) based on a prediction value of $Z_0$ such that the trellis encoder generates a data symbol having one of four levels $\{-7, -1, 3, 5\}$ expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 0 | 0 | 0 | 0 | -7 |
| 1 | 0 | 1 | 1 | 1 | 0 | 5 |
| 0 | 0 | 0 | 0 | 0 | 0 | -7 |
| 1 | 0 | 1 | 1 | 1 | 0 | 5 |
| 0 | 1 | 1 | 0 | 1 | 1 | -1 |
| 1 | 1 | 0 | 1 | 0 | 1 | 3 |
| 0 | 1 | 1 | 0 | 1 | 1 | -1 |
| 1 | 1 | 0 | 1 | 0 | 1 | 3 | wherein $Z_0^*$ is a prediction value of $Z_0$.

7. The system as recited in claim 2, wherein the input means includes a multiplexer for multiplexing the normal data and the robust data when the digital video data streams include the normal data and the robust data,
wherein a location of the robust data is defined by an equation as:

$RPI=312/NRP$ $RPP=\text{floor}(RPI \times r)$ where NRP denotes the number of the robust data packets included in the data frame to be transmitted; RPI denotes a robust data packet interval; RPP is a robust data packet position; floor(*) denotes a decimal cut-out computation; and r is an integer ranging from 0 to the NRP.

8. The system as recited in claim 1, wherein the encoding means includes a determining unit for selecting one of two groups $\{-5, -3, 1, 7\}$ and $\{-7, -1, 3, 5\}$ as a group to which the robust data is mapped.

9. A system for transmitting a digital signal, comprising:
an input means for receiving a digital video data stream;
a first encoding means for encoding robust data included in the digital video stream wherein the robust data are mapped to one of two groups $\{-5, -3, 1, 7\}$ and $\{-7, -1, 3, 5\}$ each grow having four levels;
a second encoding means for encoding robust data such that the robust data are mapped to another group having four levels;
a selecting means for enabling one of the first encoding means and the second encoding means to receive the robust data; and
a VSB transmitting means for performing VSB modulation of the encoded signal to generate a VSB modulated signal and transmitting the VSB modulated signal.

10. The system as recited in claim 9, wherein the digital video data stream includes normal data.

11. The system as recited in claim 10, wherein one of the first encoding means and the second encoding means encodes the normal data such that the normal data are mapped into $\{-7, -5, -3, -1, 1, 3, 5, 7\}$.

12. A system for transmitting/receiving a digital signal, comprising:
a transmitting apparatus for transmitting the digital signal; and
a receiving apparatus for the digital signal,
wherein the transmitting apparatus includes:
an input means for receiving a digital video data stream;
an encoding means for encoding robust data included in the digital video data stream such that the robust data are mapped to one of two groups $\{-5, -3, 1, 7\}$ and $\{-7, -1, 3, 5\}$ each group having four levels, to thereby generate an encoded signal; and
a VSB transmitting means for performing VSB modulation of the encoded signal to generate a VSB modulated signal and transmitting the VSB modulated signal,
wherein the receiving apparatus includes:
a receiver for receiving and converting the VSB modulated signal into a baseband signal;
an equalizer for deciding a level of the robust data based on the group which is used for encoding the robust data in the transmitting apparatus, to thereby generate an equalized signal; and
a trellis decoding means for performing trellis decoding of the equalized signal based on the group which is used for encoding the robust data in the transmitting apparatus, to thereby generate a trellis decoded signal; and
a decoding means for decoding the trellis decoded signal to restore the digital video data stream.

13. The system as recited in claim 12, wherein the digital video data streams includes normal data.

14. The system as recited in claim 13, wherein the encoding means encodes the normal data such that the normal data are mapped into $\{-7, -5, -3, -1, 1, 3, 5, 7\}$,
the equalizer decides a level of the normal data based on $\{-7, -5, -3, -1, 1, 3, 5, 7\}$ to generated equalized normal data, and
the trellis decoding means performs trellis decoding of the equalized normal data based on $\{-7, -5, -3, -1, 1, 3, 5, 7\}$.

15. The system as recited in claim 12, wherein the encoding means includes:
a robust encoder for encoding two bits of information data $(X_1', X_2')$ of the digital video signal to generate two bits of data symbol represented by $(X_1, X_2)$; and
a trellis encoder for encoding the two bits of data symbol represented by $(X_1, X_2)$ to generate three bits of data symbols each having one of three levels represented by $(Z_2, Z_1, Z_0)$.

16. The system as recited in claim 15, wherein the robust encoder encodes the information data($X_1'$) based on a prediction value of $Z_0$ such that the trellis encoder generates a data symbol having one of four levels $\{-5, -3, 1, 7\}$ expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 1 | 0 | 1 | 0 | -3 |
| 1 | 0 | 0 | 1 | 0 | 0 | 1 |
| 0 | 0 | 1 | 0 | 1 | 0 | -3 |
| 1 | 0 | 0 | 1 | 0 | 0 | 1 |
| 0 | 1 | 0 | 0 | 0 | 1 | -5 |
| 1 | 1 | 1 | 1 | 1 | 1 | 7 |
| 0 | 1 | 0 | 0 | 0 | 1 | -5 |
| 1 | 1 | 1 | 1 | 1 | 1 | 7 | wherein $Z_0^*$ is a prediction value of $Z_0$.

17. The system as recited in claim 15, wherein the robust encoder encodes the information data($X_1'$) based on a prediction value of $Z_0$ such that the trellis encoder generates a data symbol having one of four levels {-7, -1, 3, 5} expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 0 | 0 | 0 | 0 | -7 |
| 1 | 0 | 1 | 1 | 1 | 0 | 5 |
| 0 | 0 | 0 | 0 | 0 | 0 | -7 |
| 1 | 0 | 1 | 1 | 1 | 0 | 5 |
| 0 | 1 | 1 | 0 | 1 | 1 | -1 |
| 1 | 1 | 0 | 1 | 0 | 1 | 3 |
| 0 | 1 | 1 | 0 | 1 | 1 | -1 |
| 1 | 1 | 0 | 1 | 0 | 1 | 3 | wherein $Z_0^*$ is a prediction value of $Z_0$.

18. The system as recited in claim 13, wherein the input means includes a multiplexer for multiplexing the normal data and the robust data when the digital video data streams include the normal data and the robust data,
wherein a location of the robust data is defined by an equation as:
$RPI=312/NRP$
$RPP=floor(RPI \times r)$
where NRP denotes the number of the robust data packet included in the data frame to be transmitted, RPI denotes a robust data packet interval, RPP is a robust data packet position, floor(*) denotes a decimal cut-out computation, and r is an integer ranging from 0 to the NRP.

19. The system as recited in claim 12, wherein the encoding means includes a determining unit for selecting one of two groups {-5, -3, 1, 7} and {-7, -1, 3, 5} as a group to which the robust data are mapped.

20. The system as recited in claim 12, wherein the encoding means includes:
a randomizer for randomizing digital video data stream to generate a randomized signal;
an RS encoder for performing Reed Solomon (RS) encoding of the randomized signal, to thereby generate an RS encoded signal;
a robust interleaver/packet formatter for interleaving the robust data included in the RS encoded signal and formatting a robust data packet based on a coding rate of the robust data; and
an interleaver for interleaving the robust data packet.

21. The system as recited in claim 20, wherein the decoding means includes:
a deinterleaver for deinterleaving the trellis decoded signal to generate a deinterleaver signal;
a packet formatter/robust interleaver for reformatting a robust data packet having information data based on the robust data included in the deinterleaver signal;
an RS decoder for performing Reed Solomon (RS) decoding of the robust data packet to generate a RS decoded signal;
a derandomizer for derandomizing the RS decoded signal to generate a derandomized signal; and
a demultiplexer for demultiplexing the derandomized signal.

22. The system as recited in claim 21, wherein the receiving apparatus further includes:
a flag generator for generating a robust data flag indicating the robust data based on the restored robust data; and
delay buffer for buffering the robust data flag during a delay time in the deinterleaver and transmitting the robust data flag to the packet formatter/robust deinterleaver.

23. The system as recited in claim 22, wherein the delay buffer delays the robust data flag during a delay time in the deinterleaver and transmits the robust data flag to the derandomizer.

24. The system as recited in claim 23, wherein, when the digital video data stream includes the normal data and the robust data, the receiving apparatus further includes:
a delay computing means for computing a delay time for the normal data based on the robust data flag received from the delay buffer and the restored robust data and transmitting the delay time for the normal data to the derandomizer.

25. A system for transmitting/receiving a digital signal, comprising:
a transmitting apparatus for transmitting the digital signal; and
a receiving apparatus for the digital signal,
wherein the transmitting apparatus includes:
an input means for receiving a digital video data stream;
a first encoding means for encoding robust data included in the digital video stream wherein the robust data are mapped to one of two groups {-5, -3, 1, 7} and {-7, -1, 3, 5} each group having four levels;
a second encoding means for encoding robust data such that the robust data are mapped to another group having four levels;
a selecting means for enabling one of the first encoding means and the second encoding means to receive the robust data;
and
a VSB transmitting means for performing VSB modulation of the encoded signal to generate a VSB modulated signal and transmitting the VSB modulated signal,
wherein the receiving apparatus includes:
a receiver for receiving and converting the VSB modulated signal into a baseband signal;
an equalizer for deciding a level of the robust data based on the group which is used for encoding the robust data in the transmitting apparatus, to thereby generate an equalized signal; and
a trellis decoding means for performing trellis decoding of the equalized signal based on the group which is used for encoding the robust data in the transmitting apparatus, to thereby generate a trellis decoded signal; and
a decoding means for decoding the trellis decoded signal to restore the digital video data stream.

26. The system as recited in claim 25, wherein the digital video data stream includes normal data.

27. The system as recited in claim 26, wherein one of the first encoding means and the second encoding means encodes the normal data such that the normal data are mapped into $\{-7, -5, -3, -1, 1, 3, 5, 7\}$, the selecting means enables one of the first encoding means and the second encoding means to receive the normal data, the equalizer decides a level of the normal data based on $\{-7, -5, -3, -1, 1, 3, 5, 7\}$ to generated equalized normal data, and the trellis decoding means performs trellis decoding of the equalized normal data based on $\{-7, -5, -3, -1, 1, 3, 5, 7\}$.

28. The system for receiving a digital signal, comprising:
a receiver for receiving and converting a VSB modulated signal into a baseband signal;
an equalizer for deciding a level of a robust data mapped to one of two groups $\{-5, -3, 1, 7\}$ and $\{-7, -1, 3, 5\}$, based on the group which is used for encoding the robust data in a transmitting apparatus, to thereby generate an equalized signal; and
a trellis decoding means for performing trellis decoding of the equalized signal based on the group which is used for encoding the robust data in the transmitting apparatus, to thereby generate a trellis decoded signal; and
a decoding means for decoding the trellis decoded signal to restore the digital video data stream.

29. The system as recited in claim 28, wherein the digital video data streams includes normal data.

30. The system as recited in claim 29, wherein the equalizer decides a level of the normal data based on $\{-7, -5, -3, -1, 1, 3, 5, 7\}$ which is used for encoding the robust data in a transmitting apparatus, and wherein the trellis decoding means performs trellis decoding of the normal data in the equalized signal based on $\{-7, -5, -3, -1, 1, 3, 5, 7\}$ which is used for encoding the robust data in a transmitting apparatus.

31. The system for receiving a digital signal, comprising:
a receiver for receiving and converting a VSB modulated signal into a baseband signal;
an equalizer for deciding a level of a robust data mapped to groups including two groups $\{-5, -3, 1, 7\}$ and $\{-7, -1, 3, 5\}$, each group having four levels, based on the group which is used for encoding the robust data in a transmitting apparatus, to thereby generate an equalized signal; and
a trellis decoding means for performing trellis decoding of the equalized signal based on the group which is used for encoding the robust data in the transmitting apparatus, to thereby generate a trellis decoded signal; and
a decoding means for decoding the trellis decoded signal to restore the digital video data stream.

32. The system as recited in claim 31, wherein the digital video data stream includes normal data.

33. The system as recited in claim 31, wherein the equalizer decides a level of the normal data based on $\{-7, -5, -3, -1, 1, 3, 5, 7\}$ which is used for encoding the robust data in a transmitting apparatus, and wherein the trellis decoding means performs trellis decoding of the normal data in the equalized signal based on $\{-7, -5, -3, -1, 1, 3, 5, 7\}$ which is used for encoding the robust data in a transmitting apparatus.

34. A method for transmitting a digital signal, comprising the steps of:
a) receiving digital video data stream
b) encoding robust data included in the digital video data stream such that the robust data are mapped to one of two groups $\{-5, -3, 1, 7\}$ and $\{-7, -1, 3, 5\}$ each group having four levels, to thereby generate an encoded signal; and
c) performing VSB modulation of the encoded signal to generate a VSB modulated signal and transmitting the VSB modulated signal.

35. The method as recited in claim 34, wherein the digital video data stream includes normal data.

36. The method as recited in claim 35, wherein the encoding means encodes the normal data such that the normal data are mapped into $\{-7, -5, -3, -1, 1, 3, 5, 7\}$.

37. The method as recited in claim 34, wherein the step b) includes the steps of:
b-1) encoding two bits of information data $(X_1', X_2')$ of the digital video signal to generate two bits of data symbol represented by $(X_1, X_2)$; and
b-2) encoding the two bits of data symbol represented by $(X_1, X_2)$ to generate three bits of data symbols each having one of three levels represented by $(Z_2, Z_1, Z_0)$.

38. The method as recited in claim 37, wherein the step of includes the step of encoding the information data$(X_1')$ based on a prediction value of $Z_0$ such that the trellis encoder generates a data symbol having one of four levels $\{-5, -3, 1, 7\}$ expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 1 | 0 | 1 | 0 | -3 |
| 1 | 0 | 0 | 1 | 0 | 0 | 1 |
| 0 | 0 | 1 | 0 | 1 | 0 | -3 |
| 1 | 0 | 0 | 1 | 0 | 0 | 1 |
| 0 | 1 | 0 | 0 | 0 | 1 | -5 |
| 1 | 1 | 1 | 1 | 1 | 1 | 7 |
| 0 | 1 | 0 | 0 | 0 | 1 | -5 |
| 1 | 1 | 1 | 1 | 1 | 1 | 7 | wherein $Z_0^*$ is a prediction value of $Z_0$.

39. The system as recited in claim 4, wherein the step of includes the step of encoding the information data$(X_1')$ based on a prediction value of $Z_0$ such that the trellis encoder generates a data symbol having one of four levels $\{-7, -1, 3, 5\}$ expressed in Table as:

| $X_1'$ | $Z_0^*$ | $X_1$ | $Z_2$ | $Z_1$ | $Z_0$ | Symbol Level |
|---|---|---|---|---|---|---|
| 0 | 0 | 0 | 0 | 0 | 0 | -7 |
| 1 | 0 | 1 | 1 | 1 | 0 | 5 |
| 0 | 0 | 0 | 0 | 0 | 0 | -7 |
| 1 | 0 | 1 | 1 | 1 | 0 | 5 |
| 0 | 1 | 1 | 0 | 1 | 1 | -1 |
| 1 | 1 | 0 | 1 | 0 | 1 | 3 |
| 0 | 1 | 1 | 0 | 1 | 1 | -1 |
| 1 | 1 | 0 | 1 | 0 | 1 | 3 | wherein $Z_0^*$ is a prediction value of $Z_0$.

40. A method for transmitting/receiving a digital signal, comprising the steps of:
transmitting a digital signal; and
receiving the digital signal,
wherein the step of transmitting a digital signal includes the steps of:
a) receiving a digital video data stream;
b) encoding robust data included in the digital video data stream such that the robust data are mapped to one of two groups {−5, −3, 1, 7} and {−7, −1, 3, 5} each group having four levels, to thereby generate an encoded signal; and c) performing VSB modulation of the encoded signal to generate a VSB modulated signal and transmitting the VSB modulated signal, wherein the step of receiving a digital signal includes the steps of:

d) receiving and converting the VSB modulated signal into a baseband signal;

e) deciding a level of the robust data based on the group which is used for encoding the robust data in the transmitting apparatus, to thereby generate an equalized signal; and f) performing trellis decoding of the equalized signal based on the group which is used for encoding the robust data in the transmitting apparatus, to thereby generate a trellis decoded signal; and g) decoding the trellis decoded signal to restore the digital video data stream.

41. The method as recited in claim 40, wherein the digital video data stream includes normal data.

42. The method as recited in claim 41, wherein the step b) includes the step of encoding the normal data such that the normal data are mapped into {−7, −5, −3, −1, 1, 3, 5, 7}, the step e) includes the step of deciding a level of the normal data based on {−7, −5, −3, −1, 1, 3, 5, 7} to generated equalized normal data, and the step f) includes the step of performing trellis decoding of the equalized normal data based on {−7, −5, −3, −1, 1, 3, 5, 7}.

43. A method for receiving a digital signal, comprising the steps of:

a) receiving and converting a VSB modulated signal into a baseband signal;

b) deciding a level of a robust data mapped to one of two groups {−5, −3, 1, 7} and {−7, −1, 3, 5}, based on the group which is used for encoding the robust data in a transmitting apparatus, to thereby generate an equalized signal; and c) performing trellis decoding of the equalized signal based on the group which is used for encoding the robust data in the transmitting apparatus, to thereby generate a trellis decoded signal; and d) decoding the trellis decoded signal to restore the digital video data stream.

44. The method as recited in claim 43, wherein the digital video data stream includes normal data.

45. The method as recited in claim 44, wherein the step b) includes the step of deciding a level of the normal data based on {−7, −5, −3, −1, 1, 3, 5, 7} to generated equalized normal data, and wherein the step c) includes the step of performing trellis decoding of the equalized normal data based on {−7, −5, −3, −1, 1, 3, 5, 7}.

* * * * *

UNITED STATES PATENT AND TRADEMARK OFFICE
CERTIFICATE OF CORRECTION

PATENT NO. : 7,653,143 B2  Page 1 of 1
APPLICATION NO. : 10/541569
DATED : January 26, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Twenty-third Day of November, 2010

David J. Kappos
*Director of the United States Patent and Trademark Office*